US012101386B2

(12) United States Patent
Hunter et al.

(10) Patent No.: US 12,101,386 B2
(45) Date of Patent: Sep. 24, 2024

(54) AUTOMATIC CORRESPONDENCE OF ENCODERS AND DECODERS TO VIDEO PORTS

(71) Applicant: Stryker Corporation, Kalamazoo, MI (US)

(72) Inventors: Brandon Hunter, Hollister, CA (US); Eric Hereford, North Richland Hills, TX (US); Suman Roy, Guwahati (IN); Sean Victor Hastings, Flower Mound, TX (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 18/306,190

(22) Filed: Apr. 24, 2023

(65) Prior Publication Data

US 2023/0308526 A1     Sep. 28, 2023

Related U.S. Application Data

(62) Division of application No. 17/375,915, filed on Jul. 14, 2021, now Pat. No. 11,637,913.

(Continued)

(51) Int. Cl.
*H04N 21/226* (2011.01)
*H04L 12/28* (2006.01)
(Continued)

(52) U.S. Cl.
CPC .......... *H04L 67/60* (2022.05); *H04L 12/2827* (2013.01); *H04L 65/70* (2022.05);
(Continued)

(58) Field of Classification Search
None
See application file for complete search history.

(56) References Cited

U.S. PATENT DOCUMENTS 9,300,919 B2   3/2016 Cholas et al.
9,342,992 B2   5/2016 Jackson
(Continued)

FOREIGN PATENT DOCUMENTS

EP   1286262 A1   2/2003
WO   2007101236 A1   9/2007

OTHER PUBLICATIONS

Extended European Search Report dated Nov. 9, 2021, directed to EP Application No. 21185728.9; 9 pages.

(Continued)

*Primary Examiner* — Brian T Pendleton
*Assistant Examiner* — Jean D Saint Cyr
(74) *Attorney, Agent, or Firm* — Morrison & Foerster LLP

(57) ABSTRACT

Methods and systems for automatically determining correspondences between communication ports of a networked device and encoders and decoders connected to those communication ports. In some embodiments, the networked device and the encoders and decoders are connected to a video communications network provided by a switch. The networked device can query the video communications network for information related to the encoders and decoders to determine and save the port-to-device correspondences. In some embodiments, the networked device can extract device information from video signals received at its input ports to map the input ports to respectively connected decoders. In similar fashion, the networked device may transmit or embed port-specific information from its output ports to respectively connected encoders. Then, the networked device can query the video communications network for the port-specific information received at the encoders to map the output ports to respectively connected encoders.

21 Claims, 11 Drawing Sheets

Related U.S. Application Data

(60) Provisional application No. 63/052,391, filed on Jul. 15, 2020.

(51) Int. Cl.
| | |
|---|---|
| *H04L 65/70* | (2022.01) |
| *H04L 67/60* | (2022.01) |
| *H04L 67/75* | (2022.01) |
| *H04L 69/16* | (2022.01) |
| *H04N 21/214* | (2011.01) |
| *H04N 21/222* | (2011.01) |
| *H04N 21/233* | (2011.01) |
| *H04N 21/236* | (2011.01) |
| *H04N 21/41* | (2011.01) |
| *H04N 21/426* | (2011.01) |
| *H04N 21/436* | (2011.01) |
| *H04N 21/4363* | (2011.01) |
| *H04L 49/25* | (2022.01) |

(52) U.S. Cl.
CPC .............. *H04L 67/75* (2022.05); *H04L 69/16* (2013.01); *H04N 21/2143* (2013.01); *H04N 21/222* (2013.01); *H04N 21/43615* (2013.01); *H04N 21/43635* (2013.01); *H04L 49/25* (2013.01)

(56) References Cited

U.S. PATENT DOCUMENTS

| | | |
|---|---|---|
| 9,749,552 B2 | 8/2017 | Gopinath et al. |
| 2011/0206035 A1 | 8/2011 | Lee et al. |
| 2011/0265129 A1 | 10/2011 | Na et al. |
| 2016/0057733 A1 | 2/2016 | Grandillo et al. |
| 2017/0041554 A1 | 2/2017 | Gopinath et al. |
| 2017/0353731 A1 | 12/2017 | Wade |
| 2018/0227606 A1 | 8/2018 | Fryer et al. |
| 2019/0370926 A1* | 12/2019 | Hagland ............... H04N 13/194 |
| 2021/0287101 A1* | 9/2021 | Das ....................... G06F 18/217 |

OTHER PUBLICATIONS

Hunter et al., U.S. Notice of Allowance and Fee(s) Due mailed Dec. 19, 2022, directed to U.S. Appl. No. 17/375,915; 19 pages.

Hunter et al., U.S. Restriction Requirement dated Aug. 8, 2022, directed to U.S. Appl. No. 17/375,915; 7 pages.

Liberty AV Solutions. (Dec. 2019). "5000 Series Digitalinx IP Network Switch Configuration Guide," 83 pages.

Office Action dated Apr. 28, 2023, directed to EP Application No. 21 185 728.9; 5 pages.

* cited by examiner

AUTOMATIC CORRESPONDENCE OF ENCODERS AND DECODERS TO VIDEO PORTS

CROSS-REFERENCE TO RELATED APPLICATIONS

This application is a divisional of U.S. patent application Ser. No. 17/375,915, filed Jul. 14, 2021, which claims the benefit of U.S. Provisional Application No. 63/052,391, filed Jul. 15, 2020, the entire contents of each of which are hereby incorporated by reference herein.

FIELD

The present disclosure relates generally to video routing systems and, more specifically, to a video routing system in which encoders and decoders are automatically corresponded to video ports to which the encoders and decoders are connected.

BACKGROUND

In a medical environment, such as an operating room, multiple medical video and multimedia sources are distributed to and displayed on multiple video sinks such as displays. For example, video and multimedia sources may include one or more of an endoscopic camera, a PACS (picture archiving and communication system) computer, a camera within a surgical light (also referred to as in-light cameras), an overview camera, a video conferencing camera, etc. Examples of video sinks may include one or more wall displays, a control touch panel, a control screen, etc.

In these environments, one or more networked devices are needed to enable video signals from video sources to be flexibly routed to various video sinks. These networked devices may include video hubs, video switches, video routers, amongst other devices. If video sources and sinks are not properly configured, then displays may not be able to properly display any video or may be misrouted. Conventionally, setting up proper connections within the video communications network requires a technician to determine how the networked device is connected to various encoders and decoders and to manually assign correspondences between the networked device's communication ports with respectively connected encoders and decoders.

Manually creating correspondences of encoders/decoders to the networked device's communication ports, however, is not only complex, but also a time-consuming process during installation of the networked device. For example, in real-world environments, decoders and encoders are typically tightly fitted inside racks and connected to switches through bundles of fiber cables. The technician may need to manually inspect the serial IDs of the decoders/encoders and correctly enter these serial IDs, often long alphanumeric characters, into mapping tables on the networked device. This process may be difficult since serial IDs are typically provided beneath the encoders/decoders and is also error prone.

SUMMARY

As discussed above, generating correspondences between encoders and decoders to video ports of a networked device is complex and error prone and requires users to manually determine correspondences and match serial numbers to match ports to respectively coupled encoders/decoders. Therefore, there exists a further need for systems and methods to automatically generate correspondences between encoders and decoders to video ports of a networked device.

According to an aspect, a method for mapping communications ports of a networked device to encoders and decoders coupled to the networked device, comprises: at a networked device comprising a plurality of input ports and a plurality of output ports and coupled to a video communications network: querying the video communications network to identify a plurality of encoders and a plurality of decoders connected to the video communications network; at each input port of the plurality of input ports, providing port-specific information from the input port to a decoder connected to the input port, wherein the port-specific information identifies the input port; querying the plurality of identified decoders over the video communications network for the port-specific information received at each decoder of the plurality of identified decoders; mapping the plurality of input ports to a plurality of corresponding decoders in a mapping table based on the queried port-specific information, wherein each input port is mapped to a decoder associated with the port-specific information identifying the input port; at each output port of the plurality of output ports, receiving encoder-specific information from an encoder connected to the output port, wherein the encoder-specific information identifies the encoder; querying the plurality of identified encoders over the video communications network for the encoder-specific information associated with each encoder of the plurality of identified encoders; and mapping the plurality of output ports to a plurality of corresponding encoders in the mapping table based on the queried encoder-specific information, wherein each output port is mapped to an encoder associated with the encoder-specific information identifying the encoder.

Optionally, querying the video communications network to identify the plurality of encoders and the plurality of decoders comprises: transmitting a query to a network management application coupled to the video communications network, wherein the network management application monitors encoders and decoders connected to the video communications network.

Optionally, the port-specific information and the encoder-specific information comprise Extended Display Identification Data (EDID) information.

Optionally, the port-specific information is provided from the input port to the decoder connected to the input port using a Display Data Channel (DDC) and wherein the encoder-specific information is received from the encoder at the output port using the DDC.

Optionally, the encoder-specific information received from the encoder at the corresponding output port comprises a serial number that identifies the encoder.

Optionally, the port-specific information from the input port comprises data identifying the networked device and the input port of the networked device.

Optionally, the networked device comprises a graphical user interface (GUI) that permits a user to view port mappings.

Optionally, the method includes displaying, by the GUI, a configuration screen for mapping ports to connected devices; while displaying the configuration screen, receiving from the user a selection of an option in the configuration screen for initiating automatic mapping between ports of the networked device and connected devices; and responding to the selection of the option, initiating the querying of the video communications network to identify the plurality of encoders and the plurality of decoders, the querying of the plurality of identified decoders for the port-specific information received at each decoder, the mapping of the plurality of input ports to the plurality of corresponding decoders in the mapping table, the querying of the plurality of identified encoder for the encoder-specific information, and the mapping of the plurality of output ports to the plurality of corresponding encoders in the mapping table.

Optionally, the plurality of output ports comprises a first output port for transmitting outputs of the GUI, and wherein the mapping table comprises a mapping between the first port and a first encoder from the plurality of identified encoders, and wherein the method comprises: querying each decoder of the plurality of identified decoders over the video communications network for device information received at each decoder from a corresponding display device connected to the decoder; determining a first decoder from the plurality of identified decoders as being connected to a display designated for displaying outputs of the GUI based on the device information queried from each decoder; and saving a correspondence between the determined first decoder and the designated display.

Optionally, determining the first decoder from the plurality of identified decoders comprises: determining that the device information received at the first decoder comprises data that identifies the designated display.

Optionally, the designated display comprises a touch panel.

Optionally, the method includes routing the outputs of the GUI from the first output port through the first encoder to the first decoder to enable the user to view the outputs of the GUI on the designated display coupled to the first decoder.

Optionally, at least one encoder of the plurality of encoders or one decoder of the plurality of decoders is connected to the video communications network through a respective Transmission Control Protocol/Internet Protocol (TCP/IP) connection.

Optionally, at least one encoder of the plurality of encoders or one decoder of the plurality of decoders is connected to the video communications network through a respective User Datagram Protocol (UDP) connection.

Optionally, the method includes receiving a video signal from a first input port of the plurality of input ports; and performing one or more functions on the video signal, the one or more functions comprising: overlaying data on the video signal, recording images or video from the video signal, or streaming the video signal to one or more remote devices.

According to an aspect, a method for mapping communications ports of a networked device to encoders and decoders coupled to the networked device includes: at a networked device comprising a plurality of input ports and a plurality of output ports and coupled to a video communications network: at each output port of the plurality of output ports, embedding port-specific information to a video output signal transmitted by the output port to an encoder connected to the output port, wherein the port-specific information identifies the output port; querying the video communications network for a plurality of encoders connected to the video communications network and a plurality of port-specific information received and detected by the plurality of respective encoders; mapping the plurality of output ports to a plurality of corresponding encoders in a mapping table based on the queried port-specific information, wherein each output port is mapped to an encoder associated with the port-specific information detected by the encoder and embedded into the video output signal transmitted by the output port; for each input port of the plurality of input ports, detecting decoder-specific information from an input video signal received from a decoder connected to the input port, wherein the decoder-specific information identifies the decoder; querying the video communications network for a plurality of decoders connected to the video communications network and a plurality of decoder-specific information supplied by the plurality of respective decoders; and mapping the plurality of input ports to a plurality of corresponding decoders in the mapping table based on the queried decoder-specific information, wherein each input port is mapped to a decoder associated with the decoder-specific information supplied by the decoder and detected from the input video signal received at the input port.

Optionally, the port-specific information and the decoder-specific information comprises QR codes.

Optionally, detecting the decoder-specific information from the input video signal received from the decoder connected to the input port comprises: extracting metadata from the received input video signal; and detecting the decoder-specific information from the extracted metadata.

Optionally, extracting the metadata comprises: parsing data from portions of the input video signal.

According to an aspect, a method for mapping communications ports of a networked device to encoders and decoders coupled to the networked device, comprises: at a networked device comprising a plurality of input ports and a plurality of output ports and coupled to a video communications network: querying the video communications network to identify a plurality of encoders and a plurality of decoders connected to the video communications network; providing a plurality of video output signals having a first plurality of respective video signal characteristics to a plurality of corresponding output ports; querying the plurality of identified encoders over the video communications network for a plurality of first video signal characteristics of the plurality of respective video output signals received at the plurality of corresponding encoders; for each output port of the plurality of output ports: changing a video signal characteristic of the video output signal provided to the output port to a different video signal characteristic; querying the plurality of identified encoders over the video communications network for a plurality of second video signal characteristics of the plurality of respective video output signals received at the plurality of corresponding encoders; determining from the plurality of identified encoders an encoder whose queried first video signal characteristic changed to the different video signal characteristic based on the plurality of queried second video signal characteristics; mapping the determined encoder to the output port in a mapping table; and reverting the video signal characteristic of the video output signal to a previous video signal characteristic; and querying the plurality of input ports for a plurality of third video signal characteristics of the plurality of respective video input signals received at the plurality of corresponding input ports; and for each decoder of the plurality of identified decoders: requesting over the video communications network the decoder to change a video signal characteristic of a video signal transmitted by the decoder to a different video signal characteristic; querying the plurality of input ports for a plurality of fourth video signal characteristics of the plurality of respective video input signals received at the plurality of corresponding input ports; determining from the plurality of input ports an input port whose queried third video signal characteristic changed to the different video signal characteristic based on the plurality of queried fourth video signal characteristics; mapping the determined input port to the decoder in the mapping table; and requesting the decoder to change the video signal characteristic of the video signal transmitted by the decoder to a previous video signal characteristic.

According to an aspect, a method for communications ports of a networked device to decoders coupled to the networked device, comprises: at a networked device comprising a plurality of input ports and a plurality of output ports and coupled to a video communications network: requesting a power distribution unit (PDU) comprising a plurality of outlet ports connected to a plurality of respective devices to turn on the plurality of outlet ports to supply power to the plurality of connected devices, wherein the plurality of devices comprises encoder and decoders; querying the video communications network to identify a first plurality of encoders and decoders connected to the video communications network; and for each outlet port of the plurality of outlet ports of the PDU: requesting the PDU to turn off the outlet port to stop supplying power to a device plugged into the outlet port; querying the video communications network to identify a second plurality of encoders and decoders connected to the video communications network; detecting a device from the first plurality of identified encoders and decoders that is absent from the second plurality of identified encoders and decoders; determining whether a communications port from the plurality of input and output ports is unresponsive and no longer communicating video signals; in response to determining that the communications port is unresponsive, mapping the communications port to the detected device in a mapping table; and requesting the PDU to turn on the outlet port to resupply power back to the device plugged in to the outlet port.

According to an aspect, a method for mapping outlet ports of a power distribution unit (PDU) to encoders and decoders connected to the PDU, comprises: at a PDU comprising a plurality of outlet ports directly connected to a plurality of respective devices comprising encoders and decoders coupled to a video communications network: turning on the plurality of outlet ports to supply power to the plurality of devices plugged into the plurality of respective outlet ports; querying the video communications network to identify a first plurality of encoders and decoders connected to the video communications network; and for each outlet port of the plurality of outlet ports: turning off the outlet port to stop supplying power to a device plugged into the outlet port; querying the video communications network to identify a second plurality of encoders decoders connected to the video communications network; detecting a device from the first plurality of identified encoders and decoders that is absent from the second plurality of identified encoders and decoders; mapping the outlet port to the detected device in a mapping table; and turning on the outlet port to resupply power back to the plugged-in device.

According to an aspect, a method for mapping communications ports of a networked device to encoders and decoders coupled to the networked device includes: at a networked device comprising a plurality of input ports and a plurality of output ports and coupled to a video communications network: querying the video communications network for a plurality of encoders connected to the video communications network and a plurality of input signals received by the plurality of encoders; mapping the plurality of encoders to a plurality of video sources based on extracting video source-specific information from each input signal of the plurality of input signals to identify each video source; querying the video communications network for a plurality of decoders connected to the video communications network and a plurality of video sink-specific information received by the plurality of decoders; and mapping the plurality of decoders to a plurality of video sinks based on the plurality of video sink-specific information.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE FIGURES

The present disclosure will now be described, by way of example only, with reference to the accompanying drawings, in which.

DETAILED DESCRIPTION

Figure 1A:
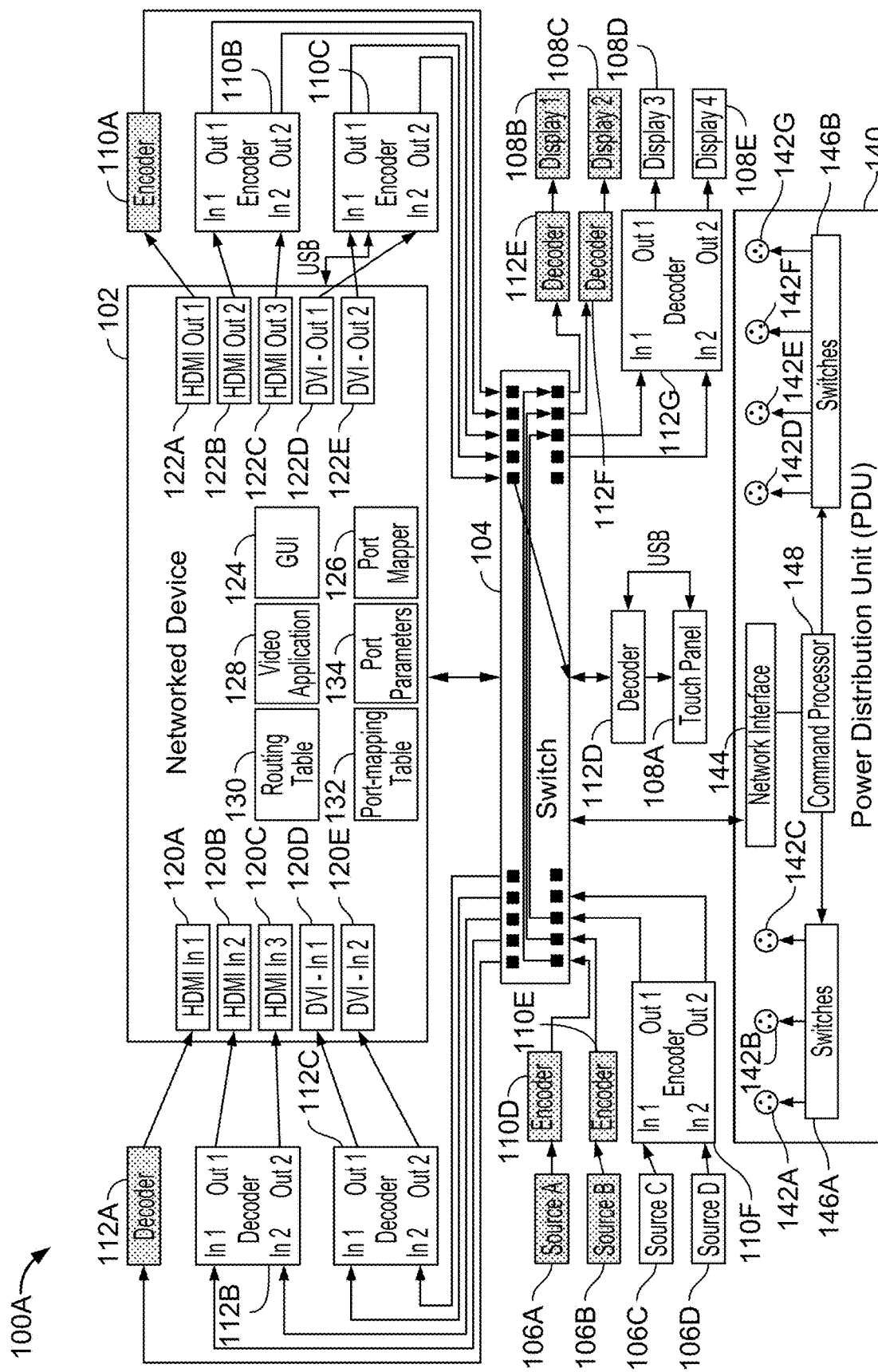
FIG. 1A illustrates a block diagram of a system for determining correspondences between video ports of a networked device and video encoders and decoders, according to some embodiments.

In the following description of the various embodiments, reference is made to the accompanying drawings, in which are shown, by way of illustration, specific embodiments that can be practiced. The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present invention include process steps and instructions described herein in the form of a method. It should be noted that the process steps and instructions of the present invention could be embodied in software, firmware, or hardware, and, when embodied in software, they could be downloaded to reside on, and be operated from, different platforms used by a variety of operating systems. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a networked device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A illustrates a block diagram of a system 100A for determining correspondences between video ports of a networked device 102 and video encoders and decoders, according to some embodiments. In operating room environments, users such as operating room nurses and surgeons operate multiple imaging devices (i.e., video sources) and multiple displays (i.e., video sinks) to perform different types of surgical procedures. As shown in system 100A, video sources 106A-D are devices that generate imaging data such as imaging devices (e.g., an endoscopic camera or a camera within a surgical light), videoconferencing equipment, or keyboard video and mouse (KVM) switches, according to some embodiments. In some embodiments, video sinks are devices for receiving and displaying video data from video sources and can include touch panel 108A and displays 108B-E. Displays 108B-E are video sinks that include monitors, wall displays, and video conferencing equipment or the like.

In some embodiments, video sources 106A-D and video sinks (i.e., touch panel 108A and displays 108B-E) can be connected to a switch 104 via encoders and decoders, respectively, to form a video communications networks. For example, video sources 106A-B can be connected to switch 104 through encoders 110D-E, respectively. In another example, an encoder such as encoder 110F may include multiple input and output ports to connect multiple video sources 106C-D to switch 104. Similarly, touch panel 108A and displays 108B-C can be connected to switch 104 via decoder 112D and decoders 112E-F, respectively. Additionally, system 100A may include a decoder such as decoder 112G that includes multiple input and output ports to connect multiple displays 108D-E to switch 104. In some embodiments, switch 104 represents one or more network switches such as 10 Gb switches.

In some embodiments, one or more of switch 104 provides a video communications network through which devices connected to switch 104 can communicate with each other. One or more of encoders 110A-F or decoders 112A-G can be connected to switch 104 through a cable connection such as a fiber-optic cable or a copper Ethernet cable, according to some embodiments. Additionally, one or more of encoders 110A-F or decoders 112A-G can implement a Transmission Control Protocol/Internet Protocol (TCP/IP) connection or a User Datagram Protocol (UDP) connection through the cable to communicate with other devices connected to the video communications network.

Although current switches such as switch 104 permits users to configure video routing between video sources 106A-D and video sinks such as video displays 108B-108E, there is a need for more flexible and easier routing configurations. For example, users may desire customizable user interfaces to change video routes. Additionally, users may desire additional video functionality such as the capability to generate video overlays or add annotations to video outputs generated by the video sources. In some embodiments, flexibility and additional video functionality can be provided by networked device 102 connected to switch 104. In some embodiments, networked device 102 may be a video router or a controlling device in the operating room. For example, networked device 102 may be an OR hub.

In some embodiments, to install networked device 102 within the video communications network, a plurality of input ports 120A-E are connected to a plurality of decoders 112A-C and a plurality of output ports 122A-E are connected to a plurality of encoders 110A-C. As shown in system 100A, the plurality of decoders 112A-C and encoders 110A-C are connected to respective ports of switch 104. Typically, devices are connected to switch 104 using fiber-optic cables or through copper Ethernet cables. As described above, as part of connecting the communication ports of networked device 102 to decoders 112A-C and encoders 110A-C, users such as the technician may need to manually configure port to decoder/encoder mappings. Each of these communication ports (e.g., an input port or an output port) is an interface or a point of connection between networked device 102 and a connected device. Through one or more of the methods 200-500 described below with respect to FIGS. 2-5, networked device 102 can be configured to automatically determine these correspondences when decoders/encoders are connected to networked device 102 and no user intervention is required.

In some embodiments, networked device 102 includes the following components: graphical user interface (GUI) 124, port mapper 126, and video application 128. In some embodiments, one or more of these components may be implemented as one or more programming instructions executable by a processor running on networked device 102. In other embodiments, one or more components may be implemented as specialized hardware on networked device 102. Additionally, networked device 102 may include routing table 130, port-mapping table 132, and port parameters 134 in memory.

In some embodiments, port mapper 126 can be configured to determine correspondences between communications ports of networked device 102 and encoders/decoders. Specifically, port mapper 126 determines which of decoders 112A-G are currently connected to input ports 120A-E and which of encoders 110A-F are currently connected to output ports 122A-E. As will be further described below with respect to FIGS. 2-5, port mapper 126 can be configured to determine port-to-device correspondences through various mechanisms.

In some embodiments, port mapper 126 queries a network management application hosted on the video communications network for information related to encoders 110A-F and decoders 112A-G to determine the port-to-device correspondences. The network management application may be software or hardware configured to monitor encoders 110A-F and decoders 112A-G as they are connected to the video communications network provided by switch 104. In some embodiments, the network management application may query an encoder or a decoder directly for a status or device specific information. In some embodiments, the network management application can be loaded on switch 104. In other embodiments, the network management application can be loaded on a separate device (e.g., server or computing device) connected to switch 104. In yet other embodiments, the network management application can be loaded within networked device 102. In such embodiments, port mapper 126 may issue internal queries to the network management application and does not need to send queries through the video communications network.

Figure 2:
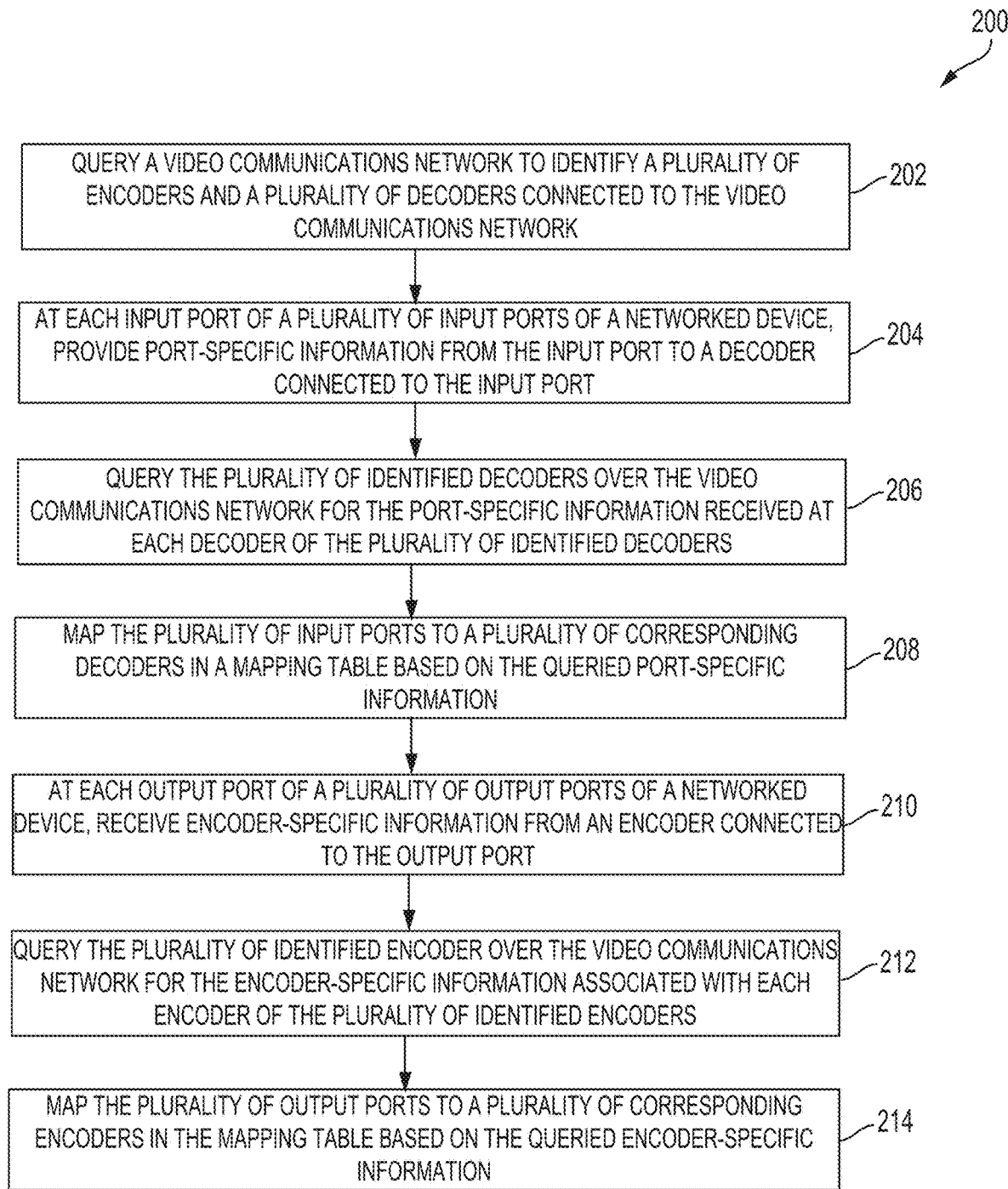
FIG. 2 illustrates a flowchart of a method for mapping communications ports of a networked device to encoders and decoders coupled to the networked device, according to some embodiments.

In some embodiments, as shown and described with respect to FIG. 2, port mapper 126 can be configured to determine port-to-device correspondences based on reading and writing to one or more communication channels of video interfaces established between communication ports and connected devices. For example, when encoders 110A-C are connected to output ports 122A-E, encoder-specific information may be transmitted from encoders 110A-C to respective output ports 122A-E through a communication channel. In some embodiments, this encoder-specific information include Extended Display Identification Data (EDID) information provided on a Display Data Channel (DDC), i.e., an example communication channel. In some embodiments, EDID information may be exchanged between a video sink and a video source that are connected through certain video interfaces such as DVI, HDMI, and DisplayPort. In some embodiments, port mapper 126 can query the network management application on the video communications network for encoder-specific information associated with each encoder on the video communications network. Based on the queried information and the encoder-specific information received at each of output ports 122A-E, port mapper 126 can determine which of encoders 110A-F are connected to each of output ports 122A-E.

Similarly, when decoders 112A-C are connected to input ports 120A-E, networked device 102 acts as a video sink and port mapper 126 may be configured to exchange port information with decoders 112A-C. In some embodiments, the information may include EDID information transmitted over a DDC channel and includes port-specific information identifying networked device 102 and the port (e.g., input port 120A) from which the port-specific information was transmitted. In these embodiments, port mapper 126 can query the network management application for which port-specific information decoders 112A-G connected to switch 104 received. Thereafter, as further described with respect to FIG. 2, port mapper 126 can determine the specific decoder connected to each of its input ports 120A-E.

In some embodiments, EDID information can include operational characteristics (e.g., native resolution) of the display that enables an attached source to generate the necessary video characteristics to match the needs of the display. Other data in the EDID information may include a brand (e.g., a manufacturer), a product code (e.g., a serial number), a date of manufacture, a video input type, a horizontal and vertical size (e.g. a maximum size), supported features, color characteristics, and timing information. The device-specific information provided through EDID may enable port mapper 126 to automatically determine port-to-device correspondences.

Figure 3:
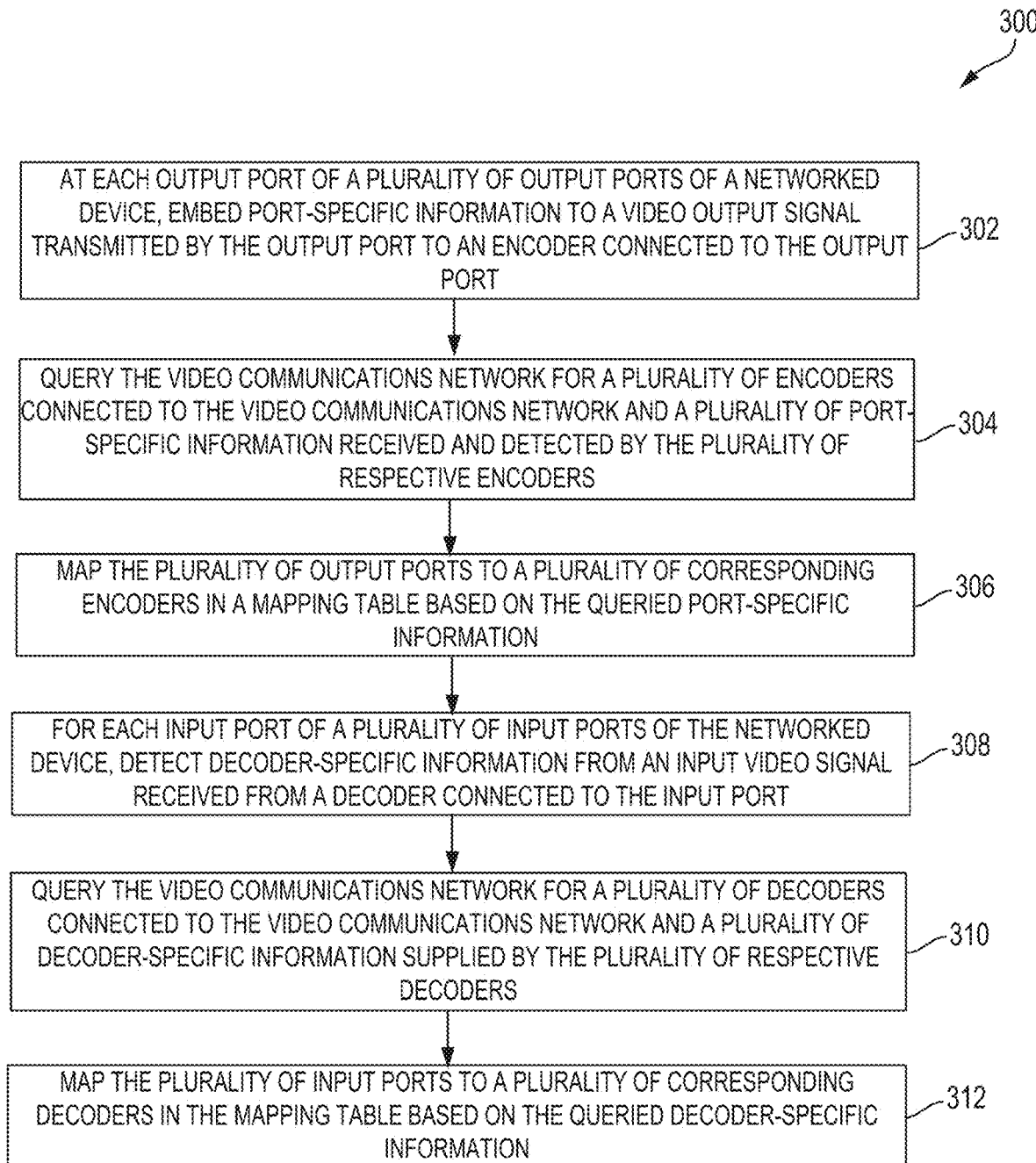
FIG. 3 illustrates a flowchart of a method for mapping communications ports of a networked device to encoders and decoders coupled to the networked device based on information embedded in video signals, according to some embodiments.

In some embodiments, as described with respect to FIG. 3, port mapper 126 can be configured to embed port-specific information to video signals output on output ports 122A-E and extract and read decoder-specific information from video signals received at input ports 120A-E to determine port-to-device correspondences. In some embodiments, the port-specific information and the decoder-specific information can be embedded within a portion of the output video signal and input video signal, respectively. For example, the port-specific information and the decoder-specific information may be embedded as metadata within one or more scan lines of video signals. In another example, the port-specific information and the decoder-specific information may be embedded as a QR code. Through the use of embedded information, port mapper 126 may be enabled to determine port-to-device correspondences regardless of the type of video interfaces established between devices and communication ports. Additionally, port mapper 126 does not need to alter characteristics of video signals and will not impact the video outputs viewed by users.

In some embodiments, as described with respect to FIG. 4, port mapper 126 can be configured to control one or more video signal characteristics of input signals and output signals to determine which encoders/decoders correspond to which communication ports. In some embodiments, a video signal characteristic may include a video resolution, a frame rate, a color bit depth, a color encoding, a color range, or a color sub-sampling. For example, prior to changing any video signal characteristics, port mapper 126 may query the network management application (e.g., loaded on switch 104 or networked device 102) for video signal characteristics of video output signals generated by decoders 112A-G and of video input signals received at encoders 110A-F. After the one or more video signal characteristics are queried, port mapper 126 may change, for example, a video resolution of a video output signal transmitted from output port 122B to encoder 110B. Port mapper 126 can re-query the network management application for the video resolution of input signals received by encoders 110A-F to determine that the video signal received at the first input port of encoder 110B matches the changed video resolution. Thereafter, port mapper 126 may determine that the first input port of encoder 110B corresponds to and is connected to output port 122B.

In some embodiments, port mapper 126 can control one or more video signal characteristics of input signals received at input ports 120A-E to determine input port to decoder correspondences. For example, port mapper 126 may request a decoder, for example, decoder 112A, from the plurality of decoders connected to the video communications network to change the video resolution of its output signal to a different video resolution. In some embodiments, port mapper 126 can send its requests to the network management application. In other embodiments, port mapper 126 can request the decoder directly if the decoder is configured with software to be capable of processing such requests from networked device 102. In either embodiments, port mapper 126 can redetect the video signal characteristics of input video signals received at input ports 120A-E to determine whether the video signal characteristics of video signals associated with any input port has changed. For example, port mapper 126 may determine that the video resolution of the video signal received at input port 120A has changed. Once determined, port mapper 126 may determine that the requested decoder, for example, decoder 112A, corresponds to and is connected to input port 120A.

In some embodiments, port-mapping table 132 can store the correspondences determined by port mapper 126 between communication ports and encoders/decoders. In some embodiments, port-mapping table 132 can include a data structure for storing port-to-device pairs.

In some embodiments, port parameters 134 can include port-specific information used by port mapper 126 to determine port-to-device correspondences. For example, with respect to the method of FIG. 2, port parameters 134 may include information identifying each of input ports 120A-E and that are transmitted from each input port to respectively connected decoders 112A-C. In another example, with respect to FIG. 3, port parameters 134 may include information to be embedded to the video signals output to each of output ports 122A-E that enables port mapper 126 to determine which encoders are connected to which of output ports 122A-E. In another example, with respect to FIG. 4, port parameters 134 may include information related to how to change one or more video signal characteristics of an output video signal to be output to each of output ports 122A-E.

In some embodiments, video application 128 can enable users such as surgeons and nurses to interact with displayed video outputs. For example, video application 128 may provide functionality including adding video overlays to displayed video to show device control properties, statuses, and other desired information. In another example, video application 128 may enable the users to add and store annotations made to displayed video data.

In some embodiments, networked device 102 includes GUI 124 that enables users to interact with networked device 102. In some embodiments, as will be further described below with respect to FIG. 2, networked device 102 can be configured to determine which of the decoders in the video communications network are connected to designated display devices for displaying GUI outputs. For example, as shown in FIG. 1A, touch panel 108A may be a designed display for GUI outputs and that is connected to decoder 112D. In some embodiments, networked device 102 can query decoders 112A-G for display-specific information of displays coupled to decoders 112A-G. Based on this display-specific information, networked device 102 can determine that one or more decoders, including decoder 112D, are connected to designated displays such as touch panel 108A. Once identified, GUI 124 can be configured to display its outputs to touch panel 108A.

In some embodiments, GUI 124 can display to a user a configuration screen for mapping communication ports to connected devices. While displaying the configuration screen, GUI 124 may receive a selection from the user for an option in the configuration screen to initiate automatic mapping between communication ports of networked device 102 and connected devices. For example, responding to the selection of the option, port mapper 126 may initiate the port-to-device mapping process such as any of those described with respect to FIGS. 2-5 below.

In some embodiments, once the port-to-device correspondences have been determined by port mapper 126 and saved to port-mapping table 132, GUI 124 can be configured to display port-mapping table 132 and further enable users to add meaningful names to identified devices connected to communication ports 120A-E and 122A-E of networked device 102.

In some embodiments, GUI 124 may further enable users to control how video signals are routed from video sources 106A-D to video displays 108B-E. In some embodiments, based on the selections and configurations provided by users and received by GUI 124, networked device 102 can be configured to update routing table 130 controlling how video signals received from input ports 120A-E are to be routed to output ports 122A-E and ultimately to video displays 108B-E.

In some embodiments, system 100A also includes a power distribution unit (PDU) 140 connected to switch 104 via network interface 144. For example, network interface may include a fiber-optic cable connection or a copper Ethernet cable connection. PDU 140 can be configured to power one or more devices in the video communications network including, for example, one or more of encoders 110A-110F or decoders 112A-112G. In some embodiments, PDU 140 can include a command processor 148 that controls switches 146A-B connected to a plurality of outlet ports 142A-G to control power supplied to one or more devices plugged into the plurality of outlet ports 142A-G. For example, decoder 112A may be plugged into outlet port 142A and PDU 140 can be configured to supply power to decoder 112A.

In some embodiments, command processor 148 can be configured to receive requests from networked device 102 to power on or off specific outlet ports 142A-G. In some embodiments, as will be further described below with respect to FIG. 5, by turning off power to a specific device such as decoder 112A, networked device 102 may be enabled to determine which device, e.g., decoder 112A, is connected to its communication ports, e.g., input port 120A. After networked device 102 has stored a port-to-device correspondence in its port-mapping table 132, command processor 148 may receive a request from networked device 102 to turn on a previously turned-off outlet port to, for example, resupply power to decoder 112A.

In some embodiments, PDU 140 can be configured to automatically determine correspondences between its outlet ports 142A-G and a plurality of respective devices plugged into those outlet ports 142A-G using a similar power cycling mechanism. For example, as will be further described below with respect to FIG. 6, PDU 140 can query the network management application (e.g., hosted on switch 104) to identify a plurality of encoders and decoders connected to the video communications network. Then, command processor 148 may control switches 146A-B to turn off and on each outlet port in sequence. While an outlet port, for example, outlet port 142B, is turned off, PDU 140 can re-query the network management application for encoders and decoders connected to the video communications network. Then, PDU 140 can compare the results of this query with a previous query to determine which device has dropped from the video communications network and therefore was being powered by the outlet port. Once this correspondence has been determined, command processor 148 may turn on the outlet port, for example 142B, to resupply power back to the device plugged into the outlet port.

Figure 1B:
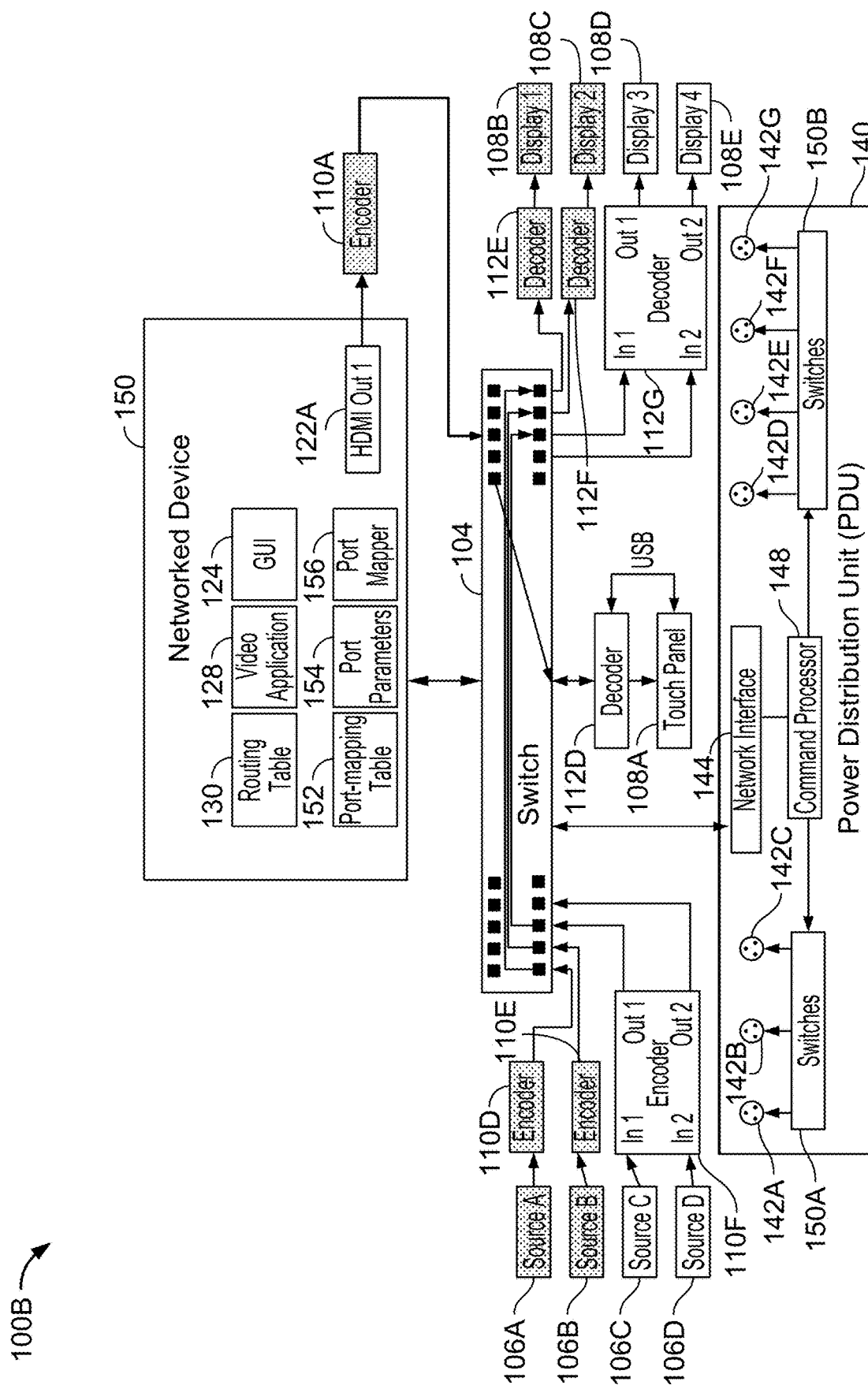
FIG. 1B illustrates a block diagram of a system for determining correspondences between encoders and decoders and video sources and sinks, respectively, according to some embodiments.

FIG. 1B illustrates a block diagram of a system 100B for determining correspondences between encoders 110D-F and decoders 112D-G and video sources 106A-D and sinks 108A-E, respectively, according to some embodiments. For ease of explanation, system 100B shows many of the same components shown in system 100A. In some embodiments, whereas networked device 102 in system 100A is configured to determine correspondences between its communication ports and connected encoders/decoders, networked device 150 is configured to determine connection correspondences between encoders 110D-F and video sources 106A-D and between decoders 112D-G and video displays 108A-E. For ease of reference, these correspondences may be referred to as encoder/decoder to video source/sink correspondences or mappings elsewhere in the present disclosure.

In some embodiments, similar to networked device 102, networked device 150 can include one or more of the same components including a GUI 124 that enables a user to view or configure encoder/decoder to video source/sink mappings, a video application 128 to apply one or more video functions on video streams, a routing table 152 for routing video from video sources to video sinks, and an output port 122A used to route GUI outputs. Networked device 150 can also include a port-mapping table 152, port parameters 154, and a port mapper 156 that are specific to determining the encoder/decoder to video source/sink mappings, as will be further described below.

In some embodiments, port mapper 156 can be configured to determine which video sources 106A-D are connected to which ports of encoders 110D-F and which video displays 108A-E are connected to which ports of decoders 112D-G. In some embodiments, port mapper 156 queries a network management application, as described above with respect to FIG. 1, hosted on the video communications network for information related to encoders 110D-F and decoders 112D-G to determine the port-to-video device correspondences. For example, port mapper 156 may query the network management application to first identify encoders 110D-F and decoders 112D-G that are connected to the video communications network provided by one or more of switch 104.

In some embodiments, port mapper 156 can be configured to automatically determine correspondences between video sources 106A-D and ports of encoders 110D-F. In some embodiments, after identifying encoders 110D-F on the video communications network, port mapper 156 can query individual encoders 110D-F for input video signals received from respectively connected video sources 106A-D. Then, port mapper 156 can be configured to analyze an input video signal received by each of encoders 110D-F to determine which video source from video sources 106A-D is connected to a particular port of the encoder. In some embodiments, once a correspondence between a port of an encoder and a video source is determined, port mapper 156 can be configured to store the determined correspondence in port-mapping table 152.

In some embodiments, similar to how port mapper 126 of FIG. 1A can detect decoder-specific information from an input video signal as further described below with respect to FIG. 3, port mapper 156 can detect video source-specific information from an input video signal received by an encoder to determine which video source is connected to the encoder. In some embodiments, the source-specific information may identify the video source. For example, the source-specific information may include a model type, a serial number, an IP address, or other IDs indicating the video source. In some embodiments, the source-specific information can be embedded in a portion of the input video signal. For example, when video source 106A is connected to encoder 110D, encoder 110D may receive an input video signal from video source 106A. Port mapper 156 may query encoder 110D for the input video signal, extract the source-specific information from the input video signal to determine that the input video signal was generated by video source 106A, after which port mapper 156 can store the correspondence between video source 106A and encoder 110D in port-mapping table 152.

In some embodiments, port mapper 156 can be configured to extract the source-specific information from EDID communications exchanged between the video source and the encoder. In these embodiments, port mapper 156 can query each encoder for EDID communications exchanged between the encoder and the video source to extract the source-specific information.

In some embodiments, port mapper 156 can be configured to automatically determine correspondences between video sinks 108A-E and ports of decoders 112D-G. In some embodiments, after identifying decoders 112D-G on the video communications network, port mapper 156 can query individual decoders 112D-G for display-specific information received from connected video sinks 108A-E. In some embodiments, port mapper 156 can parse the display-specific information received at each decoder to determine which video sink from video sinks 108A-E is connected to a particular port of the decoder. In some embodiments, once a correspondence between a port of a decoder and a video sink is determined, port mapper 156 can be configured to store the determined correspondence in port-mapping table 152.

In some embodiments, similar to how port mapper 126 of FIG. 1A can parse encoder-specific information received at an output port from a connected encoder as further described below with respect to FIG. 2, port mapper 156 can query a decoder (e.g., one of decoders 112D-G) to receive and parse the display-specific information received by the decoder from a video sink connected to the decoder. In some embodiments, the display-specific information may be extracted from one or more communication channels established between the decoder and the video sink. In some embodiments, the display-specific information may identify the video sink. For example, the display-specific information may include a model type, a serial number, an IP address, a manufacturer, or other IDs indicating the video sink. In some embodiments, the display-specific information may be included in EDID information provided on a DDC channel, an example communication channel established between the decoder and the video sink. As described above with respect to FIG. 1A, EDID information may be exchanged between a video sink and a video source that are connected through certain video interfaces such as DVI, HDMI, and DisplayPort. In these embodiments, port mapper 156 can query each decoder for EDID communications exchanged between the decoder and the video sink to extract the display-specific information.

In some embodiments, port-mapping table 152 can store the correspondences determined by port mapper 156 between encoder/decoder ports and video sources/sinks. In some embodiments, port-mapping table 152 can include a data structure for storing encoder/decoder-to-device pairs. In some embodiments, GUI 124 can permit the user to view port-mapping table 152 via touch panel 108A.

In some embodiments, port parameters 154 can include port-specific information of encoders or decoders used by port mapper 156 to determine port-to-video device correspondences. For example, as described above, port parameters 154 may include source-specific information that enables port mapper 156 to determine correspondences between encoders 110D-F and video sources 106A-D. In another example, port parameters 154 may include display-specific information that enables port mapper 156 to determine correspondences between decoders 110D-G and video sinks (e.g., touch panel 108A and displays 108B-E). In another example, parameters 154 may include information related to how to change one or more video signal characteristics of an input signal received at an encoder or one or more video signal characteristics of an output signal generated by a decoder.

In some embodiments, similar to networked device 102, networked device 150 can include an output port 122A that is connected to encoder 110A to permit GUI 124 to route GUI outputs to touch panel 108A through decoder 112D. For example, as described above with respect to FIG. 1A, networked device 102 (and similarly networked device 150) can determine that touch panel 108A is connected to decoder 112D and route GUI outputs from GUI 124 to decoder 112D via output port 122A. Accordingly, when networked device 150 is connected to the video communications network provided by switch 104, the route between output port 122A and touch panel 108A can be automatically established and users may immediately view and access GUI 124 as displayed on touch panel 108A.

Figure 1C:
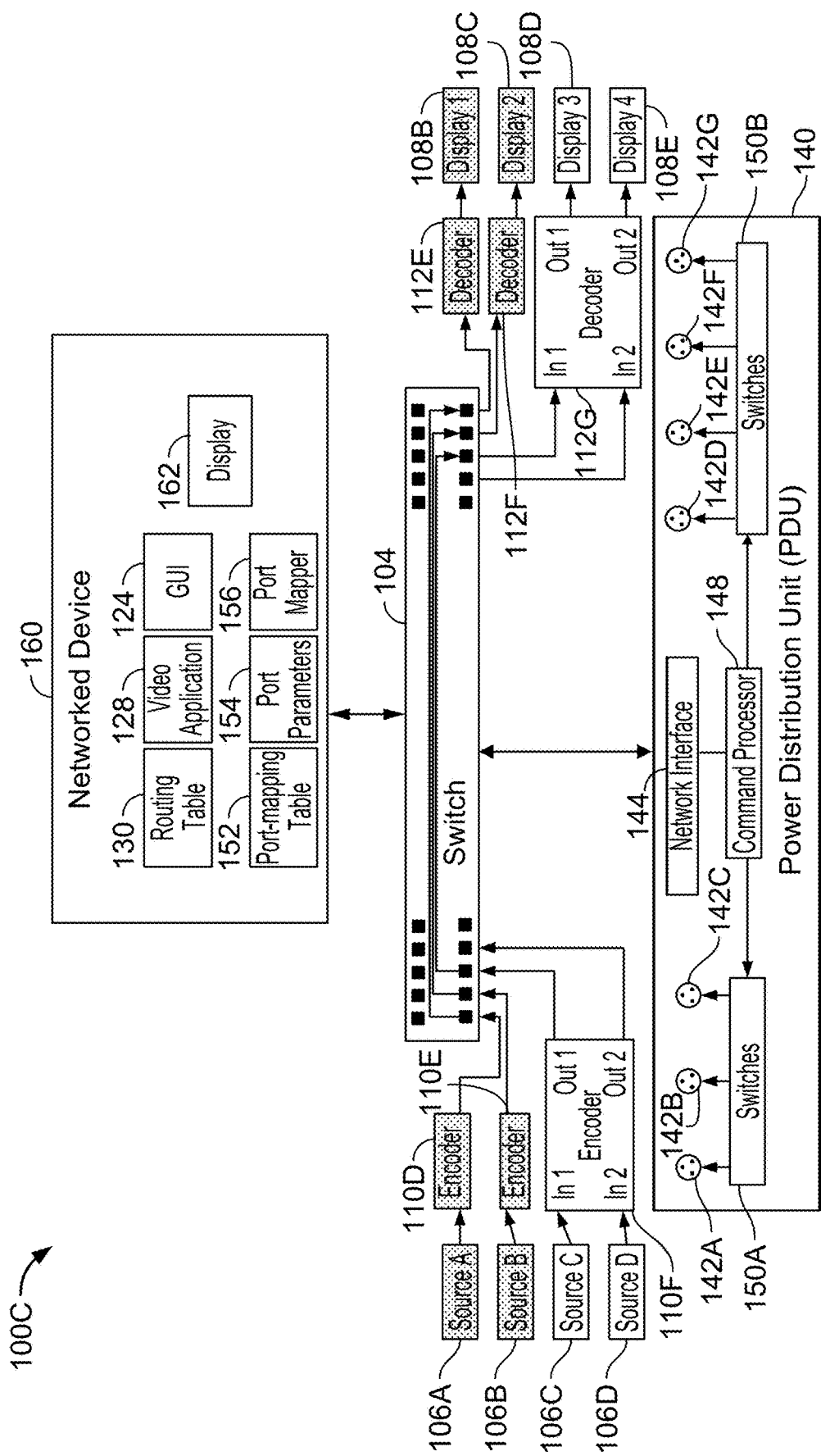
FIG. 1C illustrates a block diagram of a system for determining correspondences between encoders and decoders and video sources and sinks, respectively, according to some embodiments.

FIG. 1C illustrates a block diagram of a system 100C for determining correspondences between encoders 110D-F and decoders 112D-G and video sources 106A-D and sinks 108A-E, respectively, according to some embodiments. For ease of explanation, system 100C shows many of the same components shown in systems 100A and 100B. In some embodiments, whereas networked device 102 in system 100A is configured to determine correspondences between its communication ports and connected encoders/decoders, networked device 160 is configured to determine connection correspondences between encoders 110D-F and video sources 106A-D and between decoders 112D-G and video displays 108A-E. For ease of reference, these correspondences may be referred to as encoder/decoder to video source/sink correspondences or mappings elsewhere in the present disclosure.

In some embodiments, to determine and store these encoder/decoder to video source/sink correspondences, networked device 160 can include one or more of a GUI 124, a video application 128, or a routing table 130, each of which are described above with respect to FIG. 1A. In addition, networked device 160 can include one or more of a port-mapping table 152, port parameters 154, and a port mapper 156, each of which are described above with respect to FIG. 1B. In some embodiments, in contrast to networked device 150 of FIG. 1B, networked device 160 can include a display 162 for displaying outputs from GUI 124. Accordingly, unlike networked devices 102 and 150 of FIGS. 1A-B, networked device 160 does not need to route GUI outputs to a touch panel 108A through an encoder 110A coupled to an output port 122A.

FIGS. 2, 3, 4A-B, and 5 illustrate flowcharts of different methods 200, 300, 400A-B, and 500 for mapping communications ports of a networked device to encoders and decoders coupled to the networked device, according to some embodiments. Each of the methods 200, 300, 400A-B, and 500 can be performed by the networked device such as networked device 102 of FIG. 1A. As describe above with respect to FIG. 1A, the networked device may be a media hub, a media router, or a media switch. In some embodiments, the networked device includes a plurality of input ports and a plurality of output ports and is coupled to a video communications network managed by network switches such as switch 104 of FIG. 1A. For ease of explanation, the steps of one or more of methods 200, 300, 400A-B, and 500 may be described below with respect to system 100A of FIG. 1A.

In some embodiments, the networked device may implement a plurality of methods for automatically determining mapping correspondences between its communications ports and encoders/decoders respectively connected to those communications ports. This approach enables multiple types of encoders and decoders to be identified regardless of the type of video interface used by each encoder and decoder and grants greater flexibility and utility. For example, as will be further described below with respect to FIG. 2, one method of mapping correspondences requires the networked device read and write to a communication channel of the video interface established between a communications port and a connected encoder/decoder. This communication channel may be present only in certain video interfaces and not others. In this scenario, the networked device may execute other methods such as those described with respect to FIGS. 3-5 to determine a correspondence between a communications port and, for example, a connected decoder that does not implement a video interface using the communication channel.

In some embodiments, each of the methods 200-500 requires that the networked device queries the video communications network for data pertaining to encoders or decoders connected to the video communications network. As described above with respect to FIG. 1A, the networked device can query the video communications network in multiple ways.

In some embodiments, the networked device can be configured to query a network management application hosted on the video communications network. For example, the network management application may be hosted on a separate network management device or on a switch (e.g., switch 104) providing access to video communications network. For example, networked device 102 may be configured to query network management application loaded on switch 104 to identify connected encoders and decoders. In another example, the network management application may be hosted within the networked device itself. In these embodiments, the network management application is configured to track and monitor the presence of encoders and decoders as they are connected to the video communications network.

In some embodiments, the networked device can format the query using an API provided by the network management application to communicate with the network management application. In some embodiments, the network management application may include software loaded to the switch or another network server connected to the switch. In other embodiments, the network management application may be provided and implemented as specialized hardware.

In some embodiments, one or more of the decoders and encoders on the video communications network can run software that permit the networked device to individually query them to identify the queried encoder/decoder. In these embodiments, the networked device may broadcast its queries to all connected encoders and decoders and receive respective responses to identify the connected encoders and decoders. In other embodiments, the networked device may generate its queries to targeted encoders or decoders connected to the video communications network. For example, the switch may route the networked device's queries to selected encoders or decoders.

FIG. 2 illustrates a flowchart of a method 200 for mapping communications ports of a networked device to encoders and decoders coupled to the networked device, according to some embodiments. In some embodiments, the networked device is configured to read and write to one or more communication channels of the video interface established between a communications port and an encoder or decoder physically connected to the communications port. In some embodiments, a port mapper (e.g., port mapper 126) of the networked device can be configured to execute one or more steps of method 200.

In step 202, the networked device queries the video communications network to identify a plurality of encoders and a plurality of decoders connected to the video communications network. As noted above, a port mapper (e.g., port mapper 126) of the networked device may query the video communications network by transmitting requests to, for example, a network management application hosted on the switch or a separate device.

In step 204, at each input port of the plurality of input ports of the networked device, the networked device provides port-specific information from the input port to a decoder connected to the input port. In some embodiments, the port-specific information identifies the input port of the networked device. For example, the port-specific information may include an identifier of the networked device (e.g., a serial number) and an identifier for the specific input port from the plurality of input ports. In some embodiments, the port-specific information may be retrieved from stored port parameters such as port parameters 134.

In some embodiments, the port mapper of the networked device can embed the port-specific information within a communication channel of the video interface operating between that input port and the connected decoder. For example, the networked device may communicate with coupled decoders through the Extended Display Identification Data (EDID) format within the communication channel. In these embodiments, the networked device can send formatted EDID information through the communication channel to the connected decoder. For example, in the HDMI video interface, the communication channel carrying EDID information is known as the display data channel (DDC).

In step 206, the networked device queries the plurality of identified decoders over the video communications network for the port-specific information received at each decoder of the plurality of identified decoders. As discussed above, the port mapper of the networked device may be configured to send queries over the video communications network in one or more methods. For example, in one method, the networked device may be configured to individually query each decoder of the plurality of identified decoders. For example, the networked device may broadcast queries across the video communications network to one or more connected decoders.

In some embodiments, the network management application can be configured to monitor statuses and activity of decoders and encoders connected to the video communications. Therefore, the network management application may itself track the port-specific information received at each decoder. In these embodiments, the networked device can be configured to query the network management application to obtain the port-specific information received at each decoder. As discussed above with respect to FIG. 1A, the network management application may be installed within networked device 102, on switch 104, or on a separate device (e.g., server) connected to switch 104.

In step 208, the networked device maps the plurality of input ports to a plurality of corresponding decoders in a mapping table based on the queried port-specific information, where each input port is mapped to a decoder associated with the port-specific information identifying that input port. In some embodiments, the port mapper of the networked device may be configured to map the plurality of input ports by writing associations between the input ports and corresponding decoders to the mapping table.

In step 210, at each output port of the plurality of output ports of the networked device, the networked device receives encoder-specific information from an encoder connected to that output port. In some embodiments, the encoder-specific information identifies the connected encoder. For example, the encoder-specific information may include an identifier of the connected encoder such as a serial number.

In some embodiments, the networked device (e.g., the port mapper) can read the encoder-specific information from a communication channel of the video interface operating between that output port and the connected encoder. For example, the networked device may communicate with coupled encoders through the Extended Display Identification Data (EDID) format within the communication channel. In these embodiments, when the encoder is plugged into the networked device's output port, EDID information is communicated from the encoder to the networked device through an established communication channel. For example, in the HDMI video interface, the communication channel carrying EDID information is known as the display data channel (DDC).

In step 212, the networked device queries the plurality of identified encoders over the video communications network for the encoder-specific information associated with each encoder of the plurality of identified encoders. As discussed above, the port mapper of the networked device may send queries to individual encoders or to the network management application monitoring connected encoders and decoders of the video communications network. In some embodiments, the network management application may be installed on switch 104, a separate server connected to switch 104, or within the networked device.

In step 214, the networked device maps the plurality of output ports to a plurality of corresponding encoders in the mapping table based on the queried encoder-specific information. In some embodiments, each output port is mapped to an encoder associated with the encoder-specific information identifying that encoder. In some embodiments, the port mapper of the networked device may be configured to map the plurality of output ports by writing associations between the output ports and corresponding encoders to the mapping table.

As described above with respect to FIG. 1A, the networked device may need to store and maintain mappings between its input and output ports with respectively connected decoders and encoders to enable the networked device to properly route video data received from an input port to a specific encoder connected to an output port. In some embodiments, by creating this mapping table, the networked device may not only route video data, but also enhance received video data before properly routing the video data. For example, within an operating room context, based on options and inputs entered by ER surgeons and nurses, a video application (e.g., video application 128) on the networked device can add overlays and annotations to incoming video data. In some embodiments, the specific routing paths can be stored on a routing table (e.g., routing table 130) on the networked device and can be configured by users through a graphical user interface (e.g., GUI 124) provided by the networked device. Other methods for determining mappings between input and output ports and respectively connected decoders and encoders are described with respect to FIGS. 3-5 below.

In some embodiments, the networked device can utilize the capability of decoders to receive and read data on one or more communication channels of the video interface established between decoders and respectively connected display devices to automatically determine one or more displays designated to display a graphical user interface (e.g., GUI 124) provided by the networked device. For example, many display devices implement an EDID format to communicate display information within a communication channel to a connected decoder. In some embodiments, this functionality enables the users to immediately access the GUI provided by the networked device as soon as the networked device is connected to the switch providing the video communications network. Otherwise, a technician may need to connect and/or configure the networked device to connect to specific ports on the switch as well as to configure the networked device to direct its GUI for display on a specific designated display.

In some embodiments, the networked device may first query the video communications network for a plurality of decoders connected to the video communications network. For example, as described above with respect to step 202, a port mapper of the networked device may transmit a query using an API provided by the network management application to communicate with the network management application to determine the plurality of connected decoders.

In some embodiments, the networked device may query each decoder of the plurality of identified decoders over the video communications network for device information received at each decoder from a corresponding display device connected to the decoder. In some embodiments, this display information may include, without limitation, a manufacturer, a serial number, or other unique information associated with the display device. For example, this display information may include EDID information exchanged between decoders and connected display devices when display devices are connected to decoders.

In some embodiments, the networked device determines a first decoder form the plurality of identified decoders as being connected to a display designated for displaying outputs of the GUI based on the device information queried from each decoder. For example, the port mapper may search the device information of the plurality of identified decoders for specific unique information associated with display devices designated for displaying the GUI. In some embodiments, the networked device may determine a plurality of display devices designated for displaying outputs of the GUI. For example, the designated display may include a touch panel which can be operated by users to control the networked device.

In some embodiments, once the first display device is determined, the networked device saves a correspondence between the determined first display device and the designated display. Thereafter, the networked device can route outputs from its GUI to the first display device to enable users to operate and control operations of the networked device.

FIG. 3 illustrates a flowchart of a method 300 for mapping communications ports of a networked device to encoders and decoders coupled to the networked device based on information embedded in video signals, according to some embodiments. In some embodiments, a port mapper (e.g., port mapper 126) of the networked device can be configured to execute one or more steps of method 300.

In step 302, at each output port of the plurality of output ports of the networked device, the networked device embeds port-specific information to a video output signal transmitted by the output port to an encoder connected to the output port. In some embodiments, the port-specific information identifies the output port. For example, the port-specific information may include data identifying the networked device and the specific output port of the networked device. In some embodiments, the networked device (e.g., port mapper 126) generates a QR code that encodes the port-specific information and then embeds the generated QR code into the video output signal. In some embodiments, the port-specific information can be stored in port parameters 134. For example, port parameters 134 may include a table that associates specific output ports with respective port-specific information.

In step 304, the networked device queries the video communications network for a plurality of encoders connected to the video communications network and a plurality of port-specific information received and detected by the plurality of respective encoders. As noted above, the port mapper of the networked device may query the video communications network through various methods. For example, the networked device may broadcast its queries on the video communications network, query individual encoders, or send its query to a network management application accessible from the video communications network. In some embodiments, the network management application may be stored on the switch providing the video communications network, on a device (e.g., a network server) connected to the switch, or on the networked device itself.

In some embodiments, one or more of the encoders can be configured to extract the port-specific information embedded in the video signal received at the one or more encoders. For example, when the port-specific information is embedded as a QR code in the video signal, an encoder receiving the video signal can include hardware or software to parse the QR code to extract the port-specific information. Once the port-specific information is obtained, the encoder may record the port-specific information or notify the network management application of the extracted port-specific information.

In step 306, the networked device maps the plurality of output ports to a plurality of corresponding encoders in a mapping table based on the queried port-specific information. In some embodiments, each output port is mapped to an encoder associated with the port-specific information detected by the encoder. As described above with respect to step 302, the port-specific information was previously embedded into the video output signal transmitted by the output port to the encoder connected to the output port.

In step 308, for each input port of the plurality of input ports of the networked device, the networked device detects decoder-specific information from an input video signal received from a decoder connected to that input port. In some embodiments, the decoder-specific information identifies the decoder connected to the input port and that transmitted the input video signal received at that input port.

In some embodiments, the networked device can extract metadata from the received input video signal to detect the decoder-specific information. In some embodiments, to extract the metadata, the networked device can parse data from one or more designated portions of the input video signal. For example, the metadata may be stored in the first few scan lines of the video signal. In some embodiments, the metadata may be stored as a QR code. In this example, the networked device may include hardware or software to read the QR code to determine the decoder-specific information embedded in the received input video signal.

In step 310, the networked device queries the video communications network for a plurality of decoders connected to the video communications network and a plurality of decoder-specific information supplied by the plurality of respective decoders. In some embodiments, decoder-specific information supplied by a decoder may include data (e.g., a serial number of a unique ID) that identifies that decoder.

In some embodiments, one or more of the decoders can implement hardware or software to embed decoder-specific information within the video signal received at the input ports of the networked device. For example, a decoder may include a QR generator to generate a QR code including the decoder-specific information and embed the generated QR code into the video signal.

In step 312, the networked device maps the plurality of input ports to a plurality of corresponding decoders in the mapping table based on the queried decoder-specific information. In some embodiments, each input port is mapped to a decoder associated with the decoder-specific information supplied by the decoder and detected from the input video signal received at the input port.

As discussed above, method 200 for automatically mapping correspondences between encoders/decoders and communications ports of the networked device requires that the video interface connecting the encoders/decoders to the networked implement a specific communication channel, e.g., the display data channel (DDC). In contrast, method 300 can be implemented by the networked device as a video-interface agnostic method because the networked device determine port correspondences based on embedded data within the video signal. Method 300, however, requires the networked device to implement hardware or software to extract embedded data of received video signals and to embed certain data into output video signals. Additionally, decoders need to be configured with software or hardware to embed certain data within output signals and encoders need to be configured with software or hardware to parse and extract certain data from the video signal.

Figure 4A:
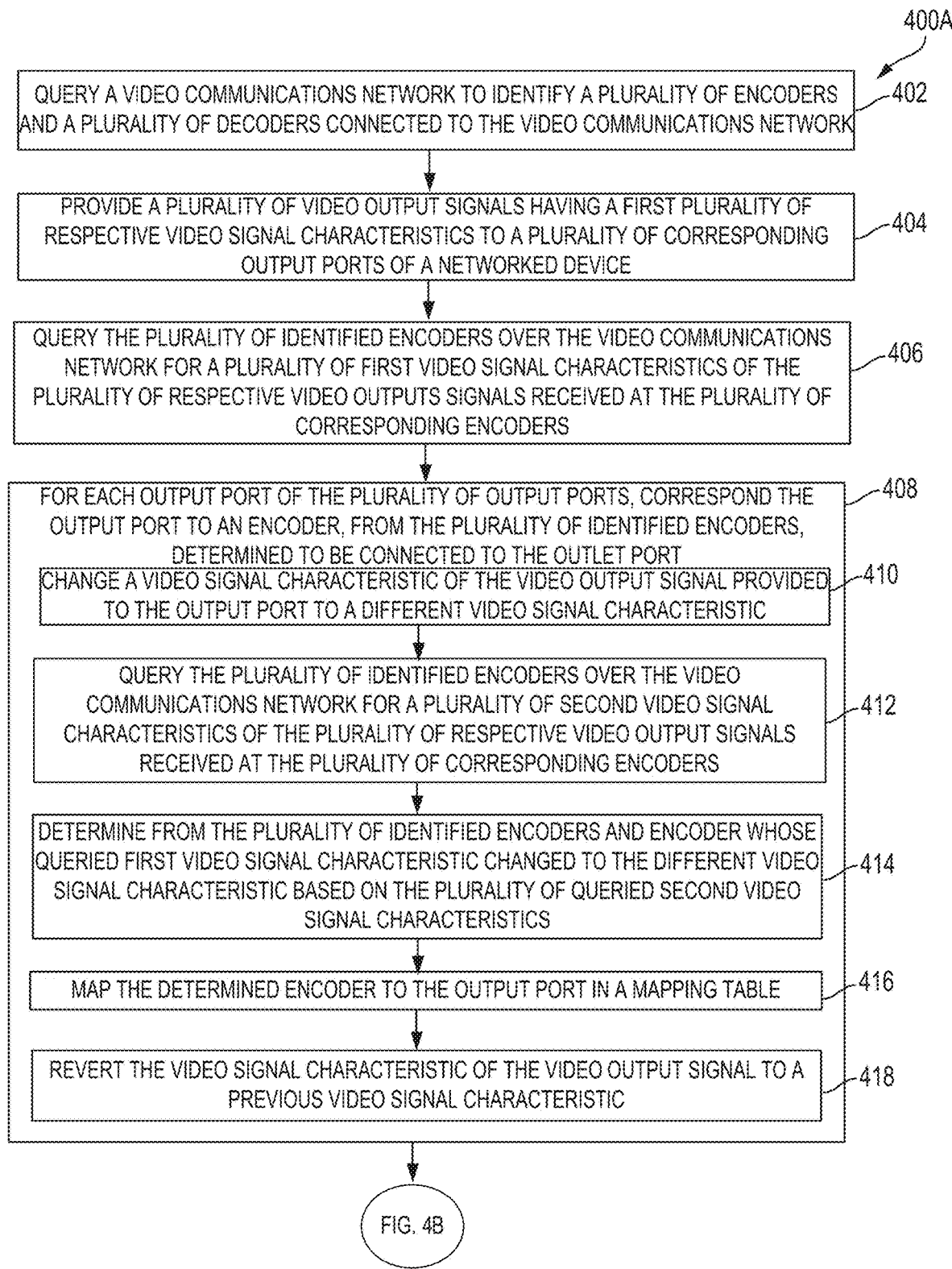
FIG. 4A and FIG. 4B illustrate flowcharts of a method for mapping communications ports of a networked device to encoders and decoders coupled to the networked device based on video signal characteristics of video signals, according to some embodiments.
Figure 4B:
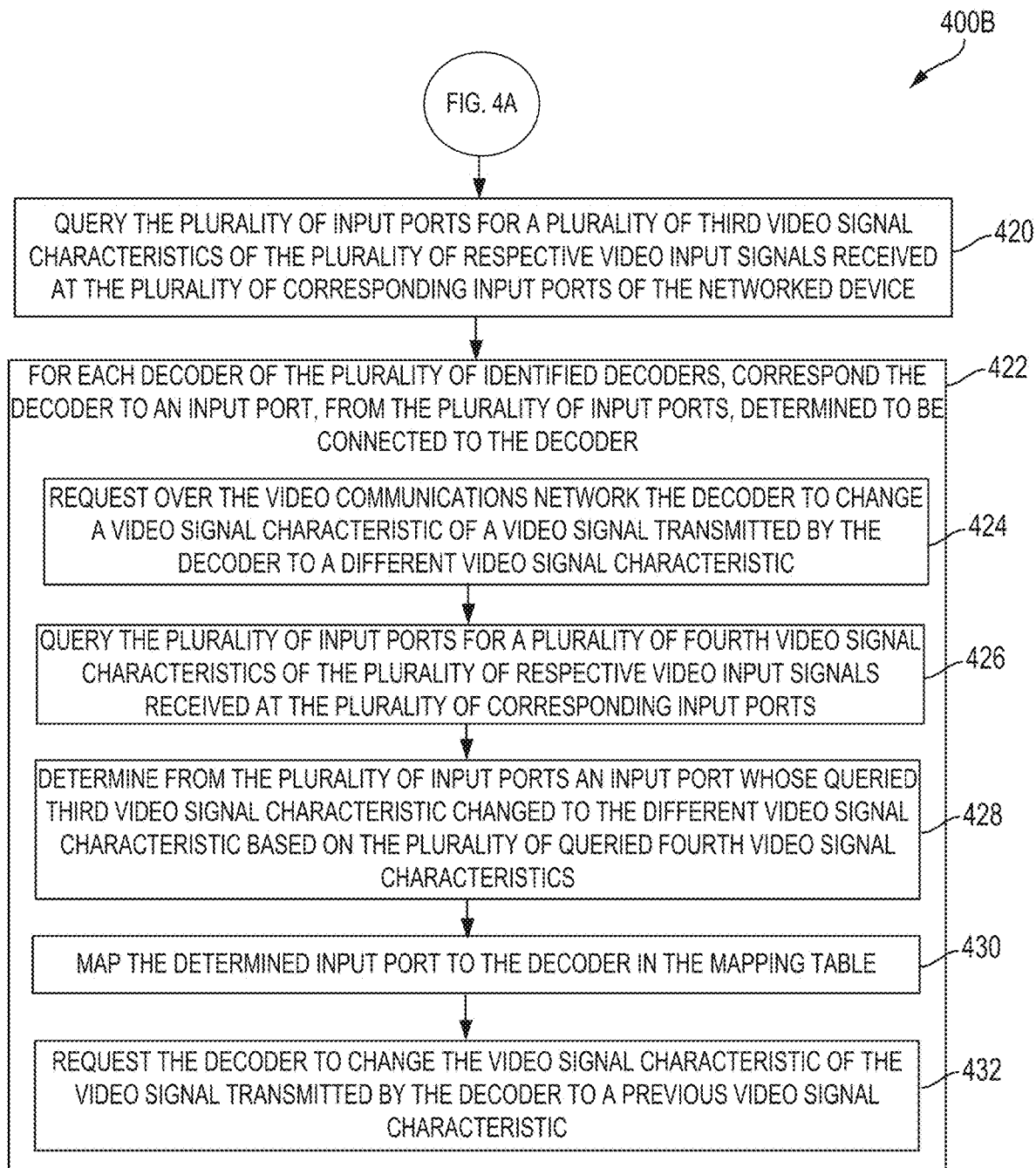

FIGS. 4A-B illustrate flowcharts of a method 400A-B for mapping communications ports of a networked device to encoders and decoders coupled to the networked device based on video signal characteristics of video signals, according to some embodiments. In some embodiments, the networked device is coupled to a video communications network and includes a plurality of input ports and a plurality of output ports. As described above with respect to FIG. 1A, the video communications network may be provided by switches such as switch 104 that connects various devices including encoders, decoders, the networked device, among others. In some embodiments, a port mapper (e.g., port mapper 126) of the networked device can be configured to execute one or more steps of method 400A-B.

In step 402, the networked device queries the video communications network to identify a plurality of encoders and a plurality of decoders connected to the video communications network. In some embodiments, the port mapper of the networked device can generate and transmit the query to a networked management application loaded on the switch providing the video communications network. As described above, the network management application may be provided by a separate device connected to the switch or may be loaded on the networked device itself. In some embodiments, in response to the query, the networked device may receive a list of decoders and encoders.

In step 404, the networked device provides a plurality of video output signals having a first plurality of respective video signal characteristics to a plurality of corresponding output ports. In some embodiments, the networked device may route video signals received from at its input ports (e.g., input ports 120A-E) to respective output ports. In some embodiments, the video signal characteristic can include one or more of a resolution, a frame rate, a color bit depth, a color encoding, a color range, or a color sub-sampling. Accordingly, the networked device may be configured to store multiple video signal characteristics of the video signal being output on each output port.

In step 406, the networked device queries the plurality of identified encoders over the video communications network for a plurality of first video signal characteristics of the plurality of respective video output signals received at the plurality of corresponding encoders. In some embodiments, a port mapper (e.g., port mapper 126) of the networked device can query the network management application on the switch or a dedicated device coupled to the switch to retrieve the plurality of first video signal characteristics. For example, in response to the query, the networked device may receive a plurality of video resolutions corresponding to a plurality of video signals received at a plurality of respective encoders. As described above with respect to step 404, the networked device may receive multiple video signal characteristics (including, for example, the video resolution) for each video signal, according to some embodiments.

In step 408, for each output port of the plurality of output ports, the networked device corresponds the output port to an encoder, from the plurality of identified encoders, determined to be connected to the outlet port. As will be further described below, the networked device may be configured to determine the correspondence by modifying and comparing video signal characteristics of the output video signals. In some embodiments, step 408 includes steps 410-418 performed for each output port.

In step 410, the networked device changes a video signal characteristic of the video output signal provided to the output port to a different video signal characteristic. For example, the port mapper of the networked device may change (e.g., decrease or increase) a first video resolution of the video output signal to a second video resolution different from the first video resolution. In some embodiments, the port mapper can be configured to change a plurality of video signal characteristics of the video output signal. After changing this video signal characteristic of the video output signal, the encoder connected to the output port will receive this video output signal whose video signal characteristic has been modified.

In step 412, the networked device queries the plurality of identified encoders over the video communications network for a plurality of second video signal characteristics of the plurality of respective video output signals received at the plurality of corresponding encoders. For example, the port mapper may query the network management application on the switch for the plurality of second video signal characteristics. The network management application may monitor and record the presence of encoders and decoders as they are connected to the video communications network as well as query the encoders and decoders for video signal characteristics. In some embodiment, the networked device may send queries over the video communications network to the identified encoders directly.

In step 414, the networked device determines from the plurality of identified encoders an encoder whose queried first video signal characteristic changed to the different video signal characteristic based on the plurality of second video signal characteristics. For example, the port mapper may compare the plurality of first and second video signal characteristics with each other to determine the encoder whose video signal characteristic has changed.

In step 416, the networked device maps the determined encoder to the output port in a mapping table. For example, the port mapper may store an association between the determined encoder and the output port by writing to port-mapping table 132.

In step 418, the networked device reverts the video signal characteristic of the video output signal to a previous video signal characteristic. In other words, the networked device may change the video signal characteristic of the output signal to a first video signal characteristic as queried in step 406. As shown in FIG. 4A, method 400A proceeds to FIG. 4B.

In step 420, the networked device queries the plurality of input ports for a plurality of third video signal characteristics of the plurality of respective input signals received at the plurality of corresponding input ports. For example, the port mapper may associate one or more detected video signal characteristics of a video input signal received at an input port with that input port.

In step 422, for each decoder of the plurality of identified decoders, the networked device corresponds the decoder to an input port, from the plurality of input ports, determined to be connected to the decoder. As will be further described below, the networked device may be configured to determine the correspondence by modifying and comparing video signal characteristics of the input video signals. In some embodiments, step 422 includes steps 424-432 performed for each decoder.

In step 424, the networked device requests, over the video communications network, the decoder to change a video signal characteristic of a video signal transmitted by the decoder to a different video signal characteristic. In some embodiments, the port mapper of the networked device may generate and send the request to the network management application that then controls the decoder to change the video signal characteristic. As described above with respect to FIGS. 1-2, the network management application may be loaded on the switch or a separate device or server connected to the switch. In some embodiments, the port mapper may transmit its request directly to the decoder over the video communications network. In these embodiments, the switch receiving the networked device's request can direct the request to the decoder connected to the switch.

In step 426, the networked device queries the plurality of input ports for a plurality of fourth video signal characteristics of the plurality of respective video input signals received at the plurality of corresponding input ports. In some embodiments, the networked device may be configured to wait for a predetermined duration after transmitting the request in step 424 to enable the decoder to change the video signal characteristic of its video signal. In other embodiments, the networked device may receive a notification from the network management application indicating that the requested decoder has processed the networked device's request.

In step 428, the networked device determines from the plurality of input ports an input port whose queried third video signal characteristic changed to the different video signal characteristic based on the plurality of queried fourth video signal characteristics. In other words, only one of the input video signals provided by the decoders should have had its video signal characteristic changed based on the request transmitted by the networked device in step 424.

In step 430, the networked device maps the determined input port to the decoder in the mapping table. In some embodiments, the port mapper writes to port-mapping table 132 to store an association between the determined input port and the decoder.

In step 432, the networked device requests the decoder to change the video signal characteristic of the video signal transmitted by the decoder to a previous video signal characteristic. In other words, the decoder is requested to revert the video signal characteristic of its video signal prior to the change as requested by the networked device in step 424.

In some embodiments, method 400A-B can be implemented by the networked device to determine port correspondences to connected encoders and decoders regardless of the video interface established between the port and encoder/decoder. However, the user may experience visual artifacts as a video signal characteristic of a video signal is temporarily changed to enable the networked device to automatically determine port to encoder/decoder correspondences.

Figure 5:
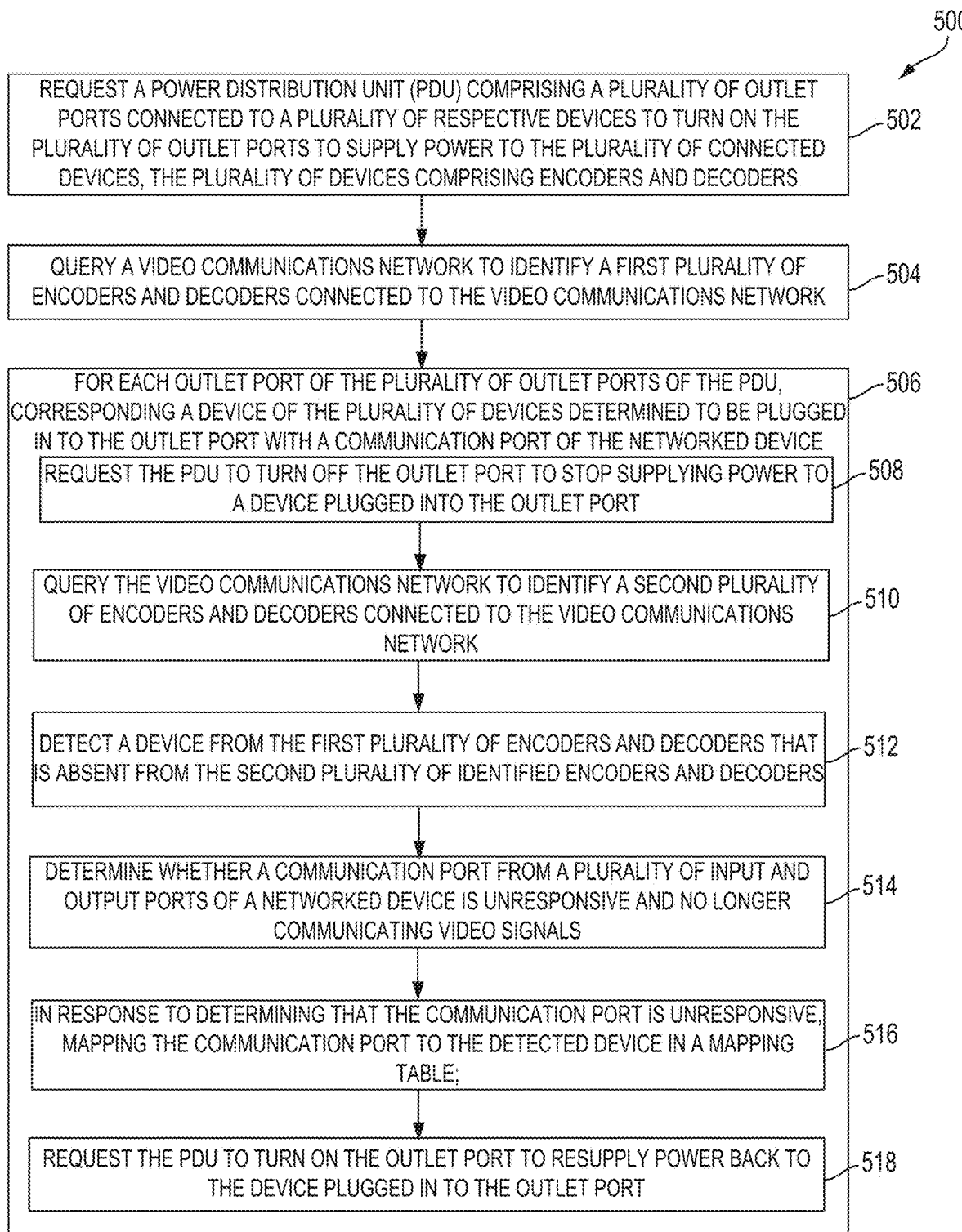
FIG. 5 illustrates a flowchart of a method for mapping communications ports of a networked device to encoders and decoders coupled to the networked device using a power distribution unit (PDU), according to some embodiments.

FIG. 5 illustrates a flowchart of a method 500 for mapping communications ports of a networked device to encoders and decoders coupled to the networked device using a power distribution unit (PDU), according to some embodiments. In some embodiments, as shown and described with respect to FIG. 1A, a plurality of encoders and decoders connected to the video communications network each be powered through respective outlet ports of the PDU such as PDU 140. In some embodiments, the PDU can be connected to the video communications network through one or more network switches such as switch 104 and can be controlled by networked device 102, as will be further described below. In some embodiments, a port mapper (e.g., port mapper 126) of the networked device can be configured to execute one or more steps of method 500.

In step 502, the networked device (e.g., port mapper 126 of networked device 102) requests the PDU comprising a plurality of outlet ports connected to a plurality of respective devices to turn on the plurality of outlets ports to supply power to the plurality of connected devices comprising encoders and decoders. For example, port mapper 126 may generate and send the request to the PDU.

As described above with respect to FIG. 1A, a command processor 148 of the PDU may receive the networked device's request via network interface 144. Then, command processor 148 may control switches 146A-B to turn on outlet ports from outlet ports 142A-G which have plugged-in devices.

In step 504, the networked device (e.g., port mapper 126) queries the video communications network to identify a first plurality of encoders and decoders connected to the video communications network. For example, a port mapper of the networked device may transmit the query to a network management application loaded on switch 104. In some embodiments, the port mapper can format the query using an API provided by the network management application.

In step 506, for each outlet port of the plurality of outlet ports of the PDU, the networked device (e.g., port mapper 126) corresponds a device of the plurality of devices determined to be plugged in to the outlet port with a communications port of the networked device. In some embodiments, step 506 can include steps 508-518 performed by the port mapper of the networked device for each output port of the PDU.

In step 508, the networked device requests the PDU to turn off the outlet port to stop supplying power to a device plugged into that outlet port. For example, command processor 148 of the PDU may receive the request to turn off outlet port 142A and control switches 146A to turn off outlet port 142A. For example, as described with respect to FIG. 1A, decoder 112A may be plugged-in to outlet port 142A. So, once outlet port 142A is turned off, decoder 112A may lose power and become disconnected from the video communications network provided by switch 104.

In step 510, the networked device queries the video communications network to identify a second plurality of encoders and decoders connected to the video communications network.

In step 512, the networked device detects a device from the first plurality of identified encoders and decoders that is absent from the second plurality of identified encoders and decoders. In the example above, the detected device may be decoder 112A which becomes disconnected from the video communications network once it powers off.

In some embodiments, the networked device can be configured to transmit a message indicating the detected device to the PDU to enable the PDU to determine correspondences between its outlet ports and devices plugged into respective outlet ports. In these embodiments, the PDU can be configured to generate mappings between outlet ports and plugged-in devices detected by the networked device. For example, in response to receiving the message indicating the detected device of step 512, the PDU can update a mapping table to associate the outlet port that was turned off in step 508 with the device detected by the networked device in step 512. The mapping table may store, on a memory of the PDU, records that associate outlet ports with respective data identifying plugged-in devices (e.g., an encoder or a decoder).

In step 514, the networked device determines whether a communications port from the plurality of input and output ports is unresponsive and no longer communicating video signals. For example, decoder 112A may be connected to communications port 120A (e.g., HDMI input port 1) and may be transmitting video signals to the networked device through communications port 120A. Once decoder 112A powers off, the networked device may stop receiving any signals at communications port 120A.

In step 516, in response to determining that the communications port is unresponsive, the networked device maps the communications port to the detected device in a mapping table. For example, port mapper 126 may write to port-mapping table 132 to associate communications port 120A with an identifier for decoder 112A.

In step 518, the networked device requests the PDU to turn on the outlet port to resupply power back to the device plugged in to the outlet port. For example, command processor 148 receiving the request from networked device 102 may control switches 146A to turn on outlet port 142A to resupply power back to, for example, decoder 112A.

In some embodiments, whereas methods 200-400 for determining correspondences between communications ports of the networked device and connected encoders and decoders require the encoders and decoders to implement certain functionality, method 500 can be implemented by networked device 102 regardless of the type of encoders or decoders in use. In other words, method 500 may be advantageous because it is compatible with off-the-shelf encoders and decoders and does not require users to reconfigure the encoders and decoders. Method 500 does require a programmable PDU such as PDU 140 that can be controlled by networked device 102. In some embodiments, due to the time period in which an encoder or decoder is powered off, there may be visual artifacts experienced by the user. For example, a display showing video data to a user may flicker briefly while an outlet port powering an encoder/decoder is power cycled to enable the networked device to automatically determine its port correspondences to connected encoders/decoders. Such visual artifacts have minimal impact on surgical procedures since method 500 for determining port-to-device correspondences is typically initiated during an installation process where the networked device (e.g., networked device 102) is installed within an operating room environment.

Figure 6:
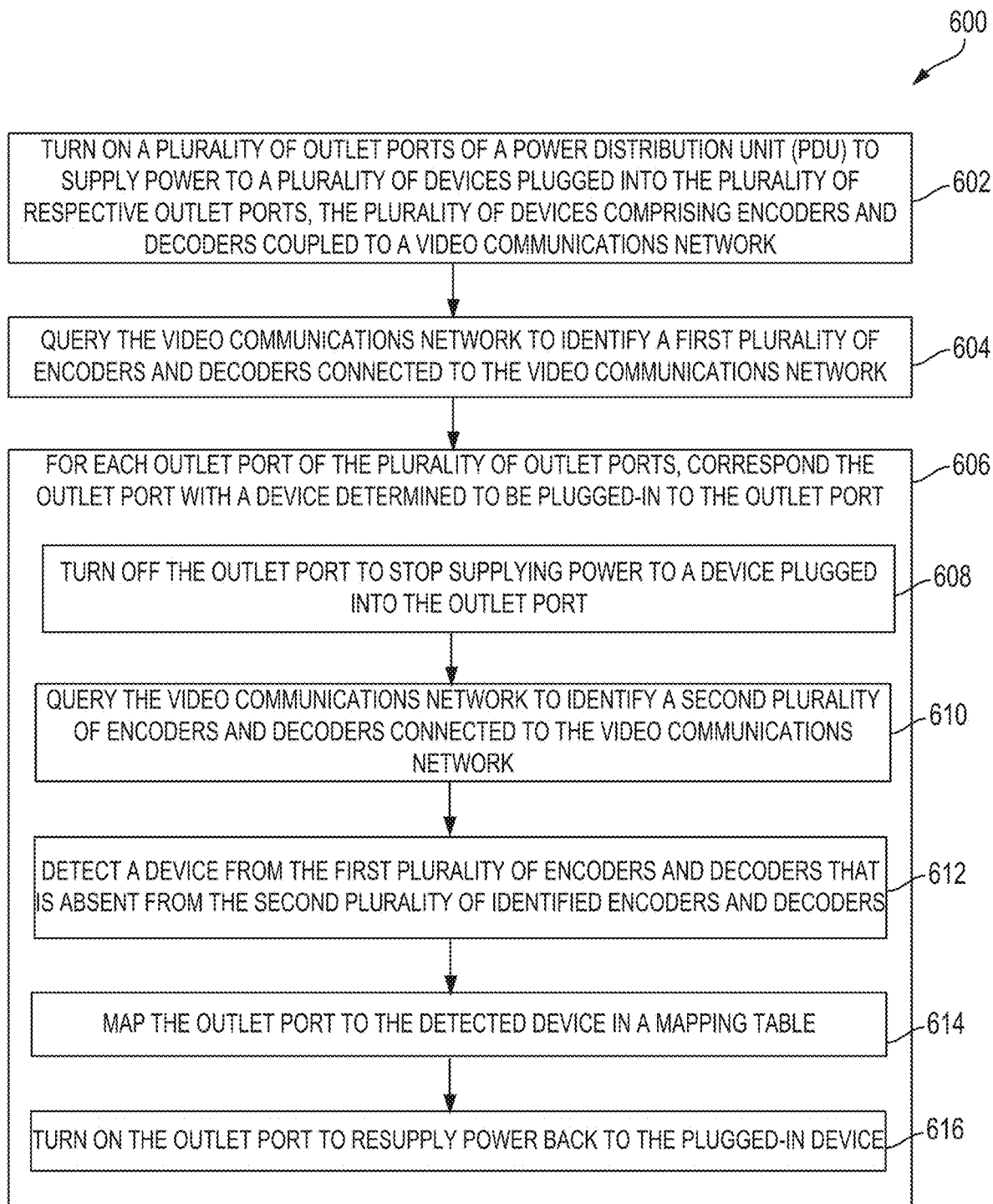
FIG. 6 illustrates a flowchart of a method for mapping outlet ports of a PDU to encoders and decoders connected to the respective outlet ports, according to some embodiments.

FIG. 6 illustrates a flowchart of a method 600 for mapping outlet ports of a PDU to encoders and decoders connected to the respective outlet ports, according to some embodiments. In some embodiments, the power cycling approach that allows a networked device to determine encoders/decoders connected to its communications ports can be similarly implemented by the PDU to enable the PDU to automatically determine correspondences between the PDU's outlet ports and encoders/decoders plugged into respective outlet ports. In some embodiments, method 600 can be performed by the PDU such as PDU 140 of FIG. 1A. In some embodiments, the PDU includes a plurality of outlet ports directly connected to a plurality of respective devices including encoders and decoders coupled to a video communications network.

In step 602, the PDU turns on a plurality of outlet ports to supply power to the plurality of devices plugged into the plurality of respective outlet ports. For example, a command processor (e.g., command processor 148) of the PDU can generate commands to switches 146A-B to turn on the outlet ports. As described above with respect to FIG. 1A, the plurality of plugged-in devices may include one or more encoders (e.g., encoders 110A-F) or one or more decoders (e.g., decoders 112A-112G) coupled to a video communications network provided by switch 104.

In step 604, the PDU queries the video communications network to identify a first plurality of encoders and decoders connected to the video communications network. For example, the command processor can generate and send the queries. As described above with respect to FIGS. 2-5, the video communications network can be queried in one or more ways. For example, the command processor of the PDU may be configured to query a network management application on the switch (e.g., switch 104) providing the video communications network. In another example, the command processor may send its query to the network management application loaded on another device (e.g., server) connected to the video communications network via switch 104. In some embodiments, the command processor can format the query using an API provided by the network management application.

In step 606, for each outlet port of the plurality of outlet ports of the PDU, the PDU corresponds the outlet port with a device determined to be plugged into the outlet port. For example, the command processor can automatically determine the correspondences and store determined correspondences in a port-mapping table, as will be further described below. In some embodiments, step 606 can include steps 608-616.

In step 608, the PDU turns off the outlet port to stop supplying power to a device plugged into the outlet port. For example, the command processor of the PDU may generate and send a command to a switch (e.g., switches 146A) controlling the outlet port to turn off that outlet port.

In step 610, the PDU queries the video communications network to identify a second plurality of encoders and decoders connected to the video communications network. For example, the command processor of the PDU may be configured to query the network management application on the switch providing video communications network.

In step 612, the PDU detects a device from the first plurality of encoders and decoders that is absent from the second plurality of identified encoders and decoders. In some embodiments, the PDU may compare the first and second pluralities of encoders and decoders to detect the device.

In step 614, the PDU maps the outlet port to the detected device in a mapping table. In some embodiments, the PDU can be configured to store the association between the detected device and the specific outlet port as an entry in the mapping table stored on the PDU. By generating and maintaining these correspondences, the PDU may be controlled by another device such as networked device 102 to turn on or off specific encoders or decoders whose power is supplied by respective outlet ports of the PDU.

In step 616, the PDU turns on the outlet port to resupply power back to the plugged-in device. In some embodiments, once the outlet port to connected device correspondence has been identified by the PDU, the command processor of the PDU can be configured to control a switch (e.g., switches 146A-B) to turn on the outlet port turned off in step 608.

Figure 8:
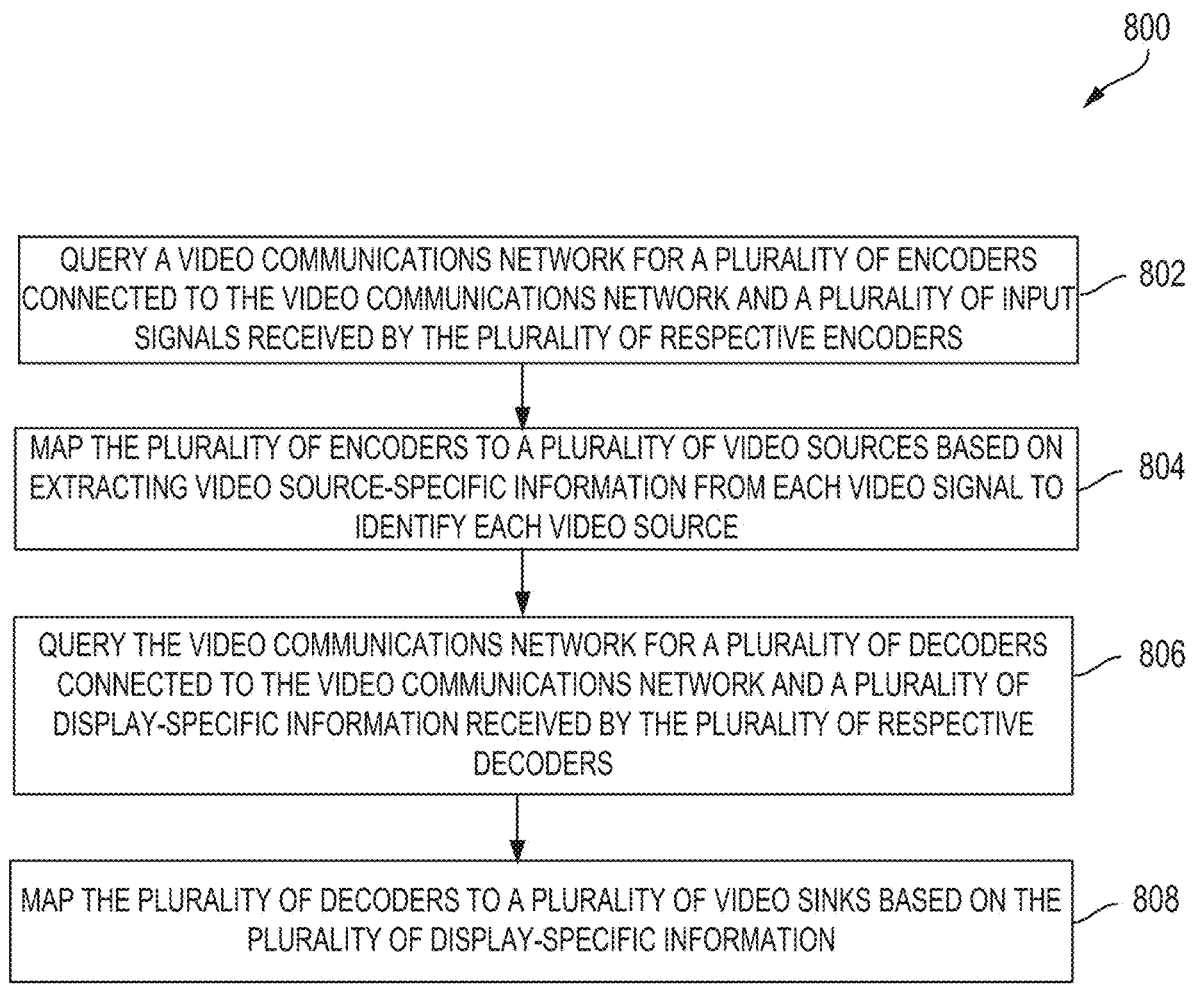
FIG. 8 illustrates a flowchart of a method 800 for mapping ports of encoders and decoders to video sources and sinks coupled to those ports, according to some embodiments.

FIG. 8 illustrates a flowchart of a method 800 for mapping ports of encoders and decoders to video sources and sinks coupled to those ports, according to some embodiments. Method 800 can be performed by a networked device such as networked device 150 or networked device 160 of FIGS. 1B and 1C, respectively. In some embodiments, a port mapper (e.g., port mapper 156) of the networked device can be configured to execute one or more steps of method 800.

In step 802, the networked device queries the video communications network for a plurality of encoders connected to the video communications network and a plurality of input signals received by the plurality of respective encoders. In some embodiments, each input video signal received at an encoder is provided by a video source (e.g., a camera) connected to that encoder.

As noted above, the port mapper of the networked device may query the video communications network through various methods. For example, the networked device may broadcast its queries on the video communications network, query individual encoders, or send its query to a network management application accessible from the video communications network. In some embodiments, the network management application may be stored on the switch providing the video communications network, on a device (e.g., a network server) connected to the switch, or on the networked device itself.

In step 804, the networked device maps the plurality of encoders to a plurality of video sources based on extracting video source-specific information from each video signal to identify each video source. For example, the networked device may extract a first video source-specific information from a first input signal received by a first encoder. The networked device may determine that the first video source-specific information identifies a first video source and would then map the first video source to the encoder.

In some embodiments, the video source-specific information may be extracted from a portion of the video signal. In some embodiments, the video source-specific information may be extracted from EDID communications between the encoder and the video source.

In step 806, the networked device queries the video communications network for a plurality of decoders connected to the video communications network and a plurality of display-specific information received by the plurality of respective decoders. In some embodiments, each output video signal generated by a decoder is provided to a specific video sink (e.g., a display) connected to that decoder.

In step 808, the networked device maps the plurality of decoders to a plurality of video sinks based on the plurality of display-specific information. For example, the display-specific information may include a model type, a serial number, a manufacturer, or other IDs indicating a specific video sink. Accordingly, the networked device can map a decoder to a video sink in response to determining that the display-specific information received by the decoder identifies the video sink. In some embodiments, the display-specific information can be extracted from EDID information transmitted from a video sink to a decoder connected to the video sink.

Figure 7:
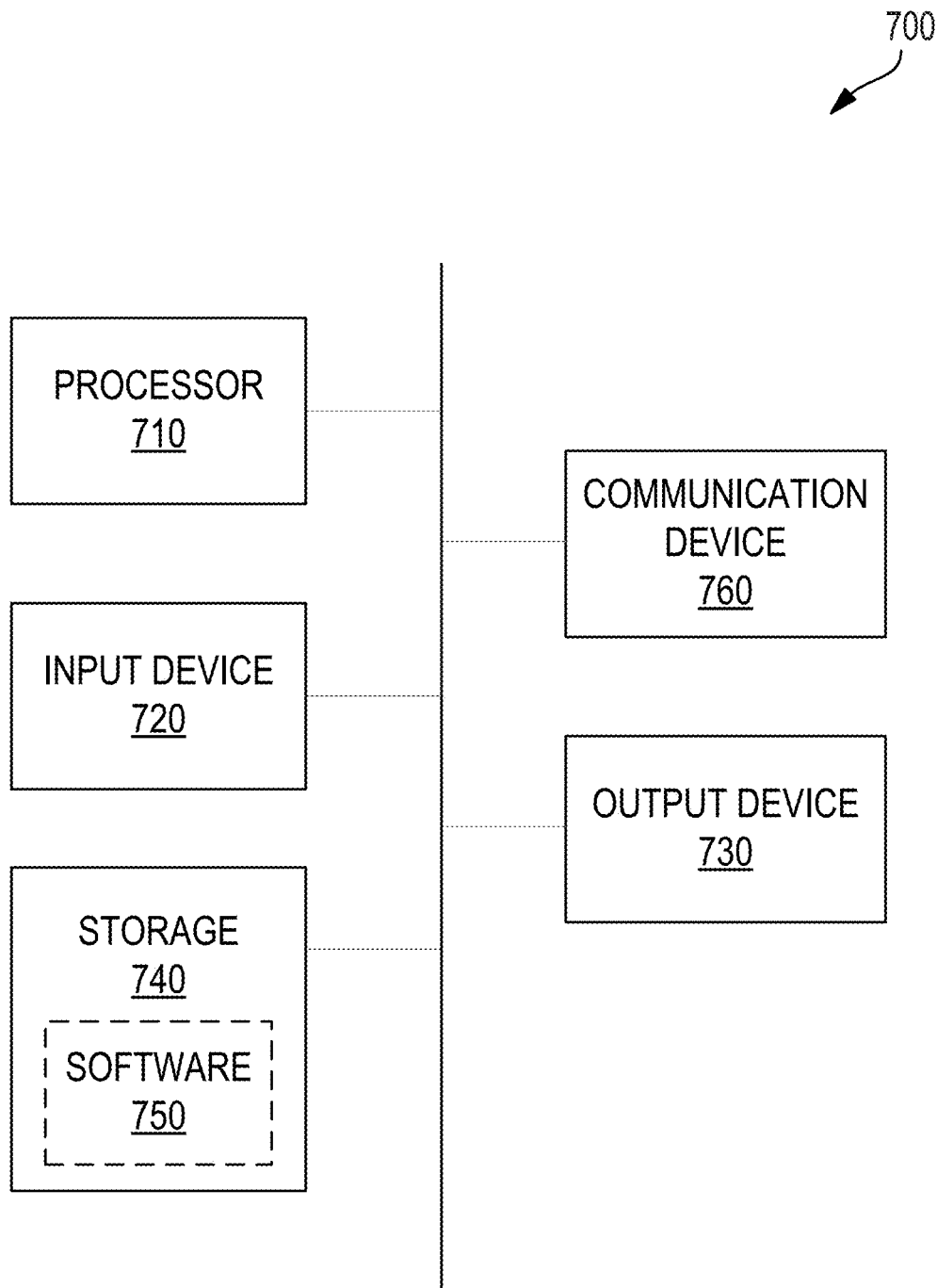
FIG. 7 illustrates an example of a computer, according to some embodiments.

FIG. 7 illustrates an example of a computing device 700, according to some embodiments. Device 700 can be a host computing device connected to a network. For example, device 700 may be an example implementation of one or more of the networked device, encoders, decoders, or other devices connected to switch 104, as described above with respect to FIGS. 1A-C. Device 700 can be a client computer or a server. As shown in FIG. 7, device 700 can be any suitable type of microprocessor-based device, such as a personal computer, work station, or server. The device can include, for example, one or more of processor 710, input device 720, output device 730, storage 740, and communication device 760. Input device 720 and output device 730 can generally correspond to those described above and can either be connectable or integrated with the computing device.

Input device 720 can be any suitable device that provides input, such as a touchscreen, keyboard or keypad, mouse, or voice-recognition device. Output device 730 can be any suitable device that provides output, such as a touchscreen, haptics device, or speaker.

Storage 740 can be any suitable device that provides storage, such as an electrical, magnetic, or optical memory including a RAM, cache, hard drive, or removable storage disk. Communication device 760 can include any suitable device capable of transmitting and receiving signals over a network, such as a network interface chip or device. The components of the computing device can be connected in any suitable manner, such as via a physical bus, or wirelessly.

Software 750, which can be stored in storage 740 and executed by processor 710, can include, for example, the programming that embodies the functionality of the present disclosure (e.g., as embodied in the devices described above). For example, software 750 may include system software (e.g., an operating system), application software, or security software.

Software 750 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction-execution system, apparatus, or device.

Software 750 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, C #, Java, or Python. In various embodiments, application software embodying the functionality of the present disclosure can be deployed in different configurations, such as in a client/server arrangement, for example.

The foregoing description, for purpose of explanation, has made reference to specific embodiments. The illustrative discussions above, however, are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will be apparent to those skilled in the art. Such changes and modifications are to be understood as being included within the scope of the disclosure and examples as defined by the claims.

What is claimed is:

1. A method for mapping encoders and decoders coupled to a video communication network, comprising: at a network device coupled to the video communications network: querying the video communications network for a plurality of encoders connected to the video communications network and a plurality of input signals received by the plurality of encoders; mapping the plurality of encoders to a plurality of video sources based on extracting video source-specific information from each input signal of the plurality of input signals to identify each video source; querying the video communications network for a plurality of decoders connected to the video communications network and a plurality of video sink-specific information received by the plurality of decoders; and mapping the plurality of decoders to a plurality of video sinks based on the plurality of video sink-specific information.

2. The method of claim 1, wherein querying the video communications network for the plurality of encoders and the plurality of decoders comprises:
transmitting a query to a network management application coupled to the video communications network, wherein the network management application monitors encoders and decoders connected to the video communications network.

3. The method of claim 1, wherein the video source-specific information and video sink-specific information comprise Extended Display Identification Data (EDID) information.

4. The method of claim 1, wherein the plurality of encoders receives the video source-specific information using a Display Data Channel (DDC), and wherein the plurality of decoders receives the video sink-specific information using the DDC.

5. The method of claim 1, wherein the video source-specific information and the video sink-specific information comprise serial numbers that identify the plurality of video sources and the plurality of video sinks.

6. The method of claim 1, wherein the video source-specific information received by a particular encoder of the plurality of encoders comprises data identifying a particular video source of the plurality of video sources corresponding to the particular encoder.

7. The method of claim 1, wherein the network device comprises a graphical user interface (GUI) that permits a user to view encoder-to-video-source and decoder-to-video-sink mappings.

8. The method of claim 7, further comprising:
displaying, by the GUI, a configuration screen for mapping encoders to video sources and decoders to video sinks; and
while displaying the configuration screen, receiving, from the user, a selection of an option in the configuration screen for initiating automatic mapping between encoders and video sources as well as between decoders and video sinks.

9. The method of claim 7, wherein the network device comprises an output port for transmitting outputs of the GUI, wherein a mapping table of the network device comprises a mapping between the output port and an encoder connected to the network device, and wherein the method further comprises: querying each decoder of the plurality of decoders for device information received at each decoder from a corresponding display device connected to the decoder;

determining a decoder of the plurality of decoders is connected to a designated display for displaying outputs of the GUI based on the device information queried from each decoder; and saving a correspondence between the determined decoder and the designated display.

10. The method of claim 9, wherein determining the decoder from the plurality of decoders comprises:
determining that the device information received at the decoder comprises data that identifies the designated display.

11. The method of claim 9, wherein the designated display comprises a touch panel.

12. The method of claim 9, further comprising:
routing the outputs of the GUI from the output port through the encoder to enable the user to view the outputs of the GUI on the designated display connected to the decoder.

13. The method of claim 1, wherein at least one encoder of the plurality of encoders or at least one decoder of the plurality of decoders is connected to the video communications network through a respective Transmission Control Protocol/Internet Protocol (TCP/IP) connection.

14. The method of claim 1, wherein at least one encoder of the plurality of encoders or at least one decoder of the plurality of decoders is connected to the video communications network through a respective User Datagram Protocol (UDP) connection.

15. The method of claim 1, further comprising:
performing one or more functions on the plurality of input signals, the one or more functions comprising: overlaying data on the plurality of input signals, recording images or video from the plurality of input signals, or streaming the plurality of input signals to one or more remote devices.

16. The method of claim 1, wherein the video source-specific information and the video sink-specific information comprise QR codes.

17. The method of claim 1, further comprising:
storing, in a mapping table of the network device, the mapping of the plurality of encoders to the plurality of video sources and the mapping of the plurality of decoders to the plurality of video sinks.

18. The method of claim 1, wherein the network device is one of the plurality of video sinks.

19. The method of claim 1, wherein the network device is one of the plurality of video sources.

20. The method of claim 1, wherein querying the video communications network for the plurality of encoders and the plurality of decoders comprises:
querying a network management application hosted on the video communications network for information related to the plurality of encoders and the plurality of decoders.

21. A network device for mapping encoders and decoders coupled to a video communication network, the network device configured for coupling to the video communication network and comprising one or more processors and memory storing one or more programs for execution by the one or more processors, the one or more programs including instructions that, when executed by the one or more processors cause the device to: query the video communications network for a plurality of encoders connected to the video communications network and a plurality of input signals received by the plurality of encoders; map the plurality of encoders to a plurality of video sources based on extracting video source-specific information from each input signal of the plurality of input signals to identify each video source; query the video communications network for a plurality of decoders connected to the video communications network and a plurality of video sink-specific information received by the plurality of decoders; and map the plurality of decoders to a plurality of video sinks based on the plurality of video sink-specific information.

\* \* \* \* \*